United States Patent
Kitaura et al.

(10) Patent No.: US 6,268,034 B1
(45) Date of Patent: Jul. 31, 2001

(54) OPTICAL INFORMATION RECORDING MEDIUM AND METHOD FOR PRODUCING THE SAME, METHOD FOR RECORDING AND REPRODUCING INFORMATION THEREON AND RECORDING/REPRODUCING APPARATUS

(75) Inventors: Hideki Kitaura, Kyoto; Katsumi Kawahara, Osaka; Noboru Yamada, Osaka; Hiroyuki Ohta, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/368,589

(22) Filed: Aug. 4, 1999

(30) Foreign Application Priority Data

Aug. 5, 1998 (JP) .................................. 10-221924
Nov. 19, 1998 (JP) .................................. 10-329890

(51) Int. Cl.$^7$ ..................................................... B32B 3/02

(52) U.S. Cl. ........................ 428/64.1; 428/64.4; 428/64.5; 428/457; 428/913; 430/270.13; 430/495.1; 430/945; 369/283

(58) Field of Search ................................. 428/64.1, 64.2, 428/64.4, 64.5, 64.6, 457, 913; 430/270.13, 495.1, 945; 369/283, 288

(56) References Cited

U.S. PATENT DOCUMENTS

| | | |
|---|---|---|
| 4,461,807 | 7/1984 | Mori et al. . |
| 4,637,976 | 1/1987 | Terao et al. . |
| 4,661,420 | 4/1987 | Nakamura et al. . |

(List continued on next page.)

FOREIGN PATENT DOCUMENTS

| | | |
|---|---|---|
| 0 375 700 | 7/1990 | (EP) . |
| 0 499 273 | 8/1992 | (EP) . |
| 0 588 305 | 3/1994 | (EP) . |
| 0 594 277 | 4/1994 | (EP) . |
| 0 837 017 | 2/1995 | (EP) . |
| 0 644 537 | 3/1995 | (EP) . |
| 0 706 177 | 4/1996 | (EP) . |

(List continued on next page.)

OTHER PUBLICATIONS

XX The Merck Index, front cover, Merk Co., Inc.

*Primary Examiner*—Elizabeth Evans
(74) *Attorney, Agent, or Firm*—Merchant & Gould P.C.

(57) ABSTRACT

An optical information recording medium of the present invention includes a transparent substrate and a multi-layered film formed on the transparent substrate. The multi-layered film includes a lower protective layer, a recording layer that changes reversibly between different states detectable optically by irradiation of light beams, an upper protective layer, an intermediate layer and a reflective layer in this order from the side near the transparent substrate. Of the upper protective layer, the intermediate layer and the reflective layer, the heat conductivity of the layer closest to the recording layer is the smallest of the three layers, and thereafter the heat conductivities of the others increase with increasing the distance from the recording layer, and the thickness of the recording layer is from 4 nm to 16 nm. In addition, a light absorption layer can be used in place of the intermediate layer. In this case, the difference between the refractive index of the light absorption layer and the refractive index of the reflective layer is 2 to 6, and the thickness of the reflective layer is not smaller than the thickness of the light absorption layer. Alternatively, the light absorption layer has a thickness d, in a range of $0.1 \lambda/(n_1 \cdot k_1) \leq d_1 \leq 1.0 \lambda/(n_1 \cdot k_1)$, where $n_1$ is a refractive index and $k_1$ is an extinction coefficient of the light absorption layer.

73 Claims, 8 Drawing Sheets

U.S. PATENT DOCUMENTS

| | | |
|---|---|---|
| 4,670,345 | 6/1987 | Morimoto et al. . |
| 4,680,742 | 7/1987 | Yamada et al . |
| 4,744,055 | 5/1988 | Hennessey . |
| 4,913,949 | 4/1990 | Streininger et al. . |
| 4,954,379 | 9/1990 | Nishida et al. . |
| 4,984,231 | 1/1991 | Yasuoka et al. . |
| 5,098,761 | 3/1992 | Watanabe et al. . |
| 5,108,846 | 4/1992 | Steininger . |
| 5,194,363 | 3/1993 | Yoshioka et al. . |
| 5,221,588 | 6/1993 | Morimoto et al. . |
| 5,283,133 | 2/1994 | Tsutsumi et al. . |
| 5,289,453 | 2/1994 | Ohno et al. . |
| 5,294,523 | 3/1994 | Nagata et al. . |
| 5,395,689 | 3/1995 | Kawahara et al. . |
| 5,395,735 | 3/1995 | Nagata et al. . |
| 5,418,030 | 5/1995 | Tominaga et al. . |
| 5,424,106 | 6/1995 | Yamada et al. . |
| 5,431,978 | 7/1995 | Nakamura et al. . |
| 5,442,619 | 8/1995 | Van Uijen et al. . |
| 5,448,551 | 9/1995 | Miyagawa et al. . |
| 5,459,019 | 10/1995 | Kato et al. . |
| 5,484,686 | 1/1996 | Maeda et al. . |
| 5,521,901 | 5/1996 | Okada et al. . |
| 5,545,454 | 8/1996 | Yamada et al. . |
| 5,580,632 | 12/1996 | Ohkawa et al. . |
| 5,591,501 | 1/1997 | Ovshinsky et al. . |
| 5,652,037 | 7/1997 | Ohkawa et al. . |
| 5,726,969 | 3/1998 | Moriya et al. . |
| 5,733,622 | 3/1998 | Starcke et al. . |
| 5,745,475 | 4/1998 | Ohno et al. . |
| 5,764,619 | 6/1998 | Nishiuchi et al. . |
| 5,776,574 | 7/1998 | Honguh et al. . |
| 5,787,061 | 7/1998 | Tsuchiya et al. . |
| 5,811,217 | 9/1998 | Akahira et al. . |
| 5,818,808 | 10/1998 | Takada et al. . |
| 5,878,018 | 3/1999 | Moriya et al. . |
| 5,882,759 | 3/1999 | Hirotsune et al. . |
| 5,914,214 | 6/1999 | Ohta et al. . |
| 5,958,649 * | 9/1999 | Hirotsune ........................ 430/270.13 |
| 5,976,659 * | 11/1999 | Abiko ................... 428/64.1 |
| 6,096,399 * | 8/2000 | Yoshinara ...................... 428/64.1 |
| 6,153,063 | 11/2000 | Yamada et al. . |

FOREIGN PATENT DOCUMENTS

| | | |
|---|---|---|
| 0 732 690 | 9/1996 | (EP) . |
| 0 825 595 | 2/1998 | (EP) . |
| 0 849 729 | 6/1998 | (EP) . |
| 56-145530 | 11/1981 | (JP) . |
| 57-50330 | 3/1982 | (JP) . |
| 62-196181 | 8/1987 | (JP) . |
| 63-50931 | 3/1988 | (JP) . |
| 63-63153 | 3/1988 | (JP) . |
| 63-103453 | 5/1988 | (JP) . |
| 63-151486 | 6/1988 | (JP) . |
| 63-171453 | 7/1988 | (JP) . |
| 1-211249 | 8/1989 | (JP) . |
| 1-276453 | 11/1989 | (JP) . |
| 2-037548 | 2/1990 | (JP) . |
| 2-78041 | 3/1990 | (JP) . |
| 2-105351 | 4/1990 | (JP) . |
| 2-265051 | 10/1990 | (JP) . |
| 2-265052 | 10/1990 | (JP) . |
| 3-40244 | 2/1991 | (JP) . |
| 3-104038 | 5/1991 | (JP) . |
| 3-113844 | 5/1991 | (JP) . |
| 3-248338 | 11/1991 | (JP) . |
| 4-52188 | 2/1992 | (JP) . |
| 4-069833 | 3/1992 | (JP) . |
| 4-102243 | 4/1992 | (JP) . |
| 4-143937 | 5/1992 | (JP) . |
| 4-219650 | 8/1992 | (JP) . |
| 4-321948 | 11/1992 | (JP) . |
| 5-2769 | 1/1993 | (JP) . |
| 5-62193 | 3/1993 | (JP) . |
| 5-159360 | 6/1993 | (JP) . |
| 5-217211 | 8/1993 | (JP) . |
| 5-274726 | 10/1993 | (JP) . |
| 5-282705 | 10/1993 | (JP) . |
| 5-290408 | 11/1993 | (JP) . |
| 5-298747 | 11/1993 | (JP) . |
| 5-298748 | 11/1993 | (JP) . |
| 5-325261 | 12/1993 | (JP) . |
| 6-195747 | 7/1994 | (JP) . |
| 7-21583 | 1/1995 | (JP) . |
| 7-105574 | 4/1995 | (JP) . |
| 7-326073 | 12/1995 | (JP) . |
| 8-85261 | 4/1996 | (JP) . |
| 61-89889 | 5/1996 | (JP) . |
| 8-190734 | 7/1996 | (JP) . |
| 8-329528 | 12/1996 | (JP) . |
| 8-329529 | 12/1996 | (JP) . |
| 10-49916 | 2/1998 | (JP) . |
| 4-78032 | 3/1999 | (JP) . |
| WO 96/00441 | 1/1996 | (WO) . |
| WO 97/34298 | 9/1997 | (WO) . |

\* cited by examiner

OPTICAL INFORMATION RECORDING MEDIUM AND METHOD FOR PRODUCING THE SAME, METHOD FOR RECORDING AND REPRODUCING INFORMATION THEREON AND RECORDING/REPRODUCING APPARATUS

BACKGROUND OF THE INVENTION

1. Field of the Invention

The present invention relates to an optical information recording medium that allows recording and reproduction of information signals with high signal quality by irradiating a thin film formed on a substrate with high energy light beams such as laser beams, a method for producing the same, a method for recording and reproducing information thereon and an optical recording/reproducing apparatus.

2. Description of the Prior Art

When a thin film made of a chalcogen material or the like formed on a substrate is heated locally by being irradiated with laser beams while irradiation conditions are adjusted, a phase change between an amorphous phase and a crystalline phase, which have different optical constants (refractive index n, extinction coefficient k), can be effected in the irradiated portion. Utilizing the phase change, a medium for high speed and high density information recording that detects a difference in the amount of reflected light or the amount of transmitted light with respect to light at a specific wavelength as a signal, and a method for utilizing the medium have been under development.

In the phase change recording, modulating laser output between two levels for recording and erasing in accordance with an information signal and irradiating information tracks with the laser output allow new signals to be recorded while erasing existing signals (e.g., Japanese Laid-Open Patent Publication (Tokkai-Sho) No. (JP-A-) 56-145530). This method is advantageous in that a magnetic circuit, which is required for magneto-optic recording, is not required so that a recording-reproducing head can be simplified, and that a rewriting period can be shortened because erasing and recording are performed simultaneously.

In order to perform phase change recording in high density, the following approach is used: A small recording mark is formed by using a light source with a short wavelength for recording or an object lens with high NA (numerical aperture), or the like, so that the linear density in the circumferential direction and the track density in the radial direction of a disk-shaped substrate can improve. Furthermore, "mark edge recording" where information is based on the length of a recording mark has been proposed for higher density in the circumferential direction, and "land and groove recording" where both grooves for guiding laser light and lands between the guide grooves on the substrate are used as recording tracks has been proposed for higher density in the radial direction.

It is important not only to achieve high density, but also to improve an information processing rate, namely, the rate at which information is recorded and reproduced. Research to achieve higher linear velocity for recording and reproduction by rotating a disk at a high revolution per minute without changing the radial position is under way.

Furthermore, a recording medium whose capacity is doubled by laminating a plurality of recordable information layers via separating layers (e.g., JP-A- 9-212917) and layer-identifying means or layer-switching means that selects one of these information layers for recording and reproduction (e.g., JP-A-10-505188) have been proposed.

When high density for recording is pursued excessively, problems such as overwrite distortion or deterioration due to repetition may be caused. In particular, when forming a recording mark in a track, a recording mark that has been recorded in an adjacent track may be erased partially. This phenomenon (hereinafter, referred to as "cross erase") is more significant as the gap between tracks is made smaller in order to improve the recording density in the radial direction. Especially in the land and groove recording, the gap between recording marks in the radial direction is about half of that in the case where information is recorded either in grooves or lands, so that the cross erase becomes significant.

The cross erase is caused by the fact that a laser light spot focused for recording affects a track adjacent to a targeted track for recording information. More specifically, direct heating of the adjacent track by the laser light or indirect heating of the adjacent track by heat conduction from the targeted track is believed to cause the cross erase.

In the case of overwriting by the same laser light, an amorphous portion and a crystalline portion have different optical absorptances, and the latent heat of melting is consumed by the crystalline portion. Therefore, a difference in the end-point temperature between the amorphous portion and the crystalline portion results when they are irradiated with laser light with the same power, so that when overwriting, the mark edge positions are not uniform due to the influence of a signal that was recorded before the overwriting. This leads to an increase in errors (jitters) in the time-axis direction of reproducing signals or deterioration in the erasure ratio. This phenomenon causes a large problem when high linear velocity and high density for recording are pursued, especially when the mark edge recording system is adopted.

In order to solve this problem, it is necessary to equalize the end-point temperatures in the crystalline portion and the amorphous portion when they are irradiated with laser light with the same power. For this end, it is necessary that a light absorptance ratio Acry/Aamo of the absorptance Acry in the crystalline portion to the absorptance Aamo in the amorphous portion is larger than 1.0 when they are irradiated with laser beams with a wavelength $\lambda$ in order to compensate for the latent heat of melting in the crystalline state. In addition, it is desirable that a reflectance difference $\Delta R = Rcry - Ramo$ between the reflectance Rcry in the crystalline portion and the reflectance Ramo in the amorphous portion is large when they are irradiated with laser beams with a wavelength $\lambda$ in order to obtain a high C/N ratio.

As conventional techniques for raising both Acry/Aamo and $\Delta R$, a three-layered structure without a reflective layer (JP-A-3-113844 and JP-A-5-298748), a reflective layer composed of a material having a low reflectance, or a four-layered structure including a reflective layer having a sufficiently small thickness (JP-A-4-102243 and JP-A-5-298747) have been proposed.

However, the above-mentioned approaches do not necessarily achieve sufficient recording and reproducing characteristics even if both Acry/Aamo and $\Delta R$ become large. For example, when the thickness of the reflective layer is small or when the heat conductivity of the reflective layer is low, so-called cooling ability that allows heat generated by light absorption of a recording layer to escape to the reflective layer is insufficient, thus disturbing the change to an amorphous state. This phenomenon occurs significantly in the front end portion of an amorphous mark, and the width of the front end portion of the mark becomes smaller than that of the rear end of the mark, thus causing an imbalance. Furthermore, this phenomenon causes not only the physical dislocation of the mark edge position from the intended position, but also the non-uniformity of the mark width results in significant dislocation of the edge position as an electric signal, thus leading to an increase of jitter. This is detrimental to recording in high density and at a high linear velocity rate.

SUMMARY OF THE INVENTION

Therefore, with the foregoing in mind, it is an object of the present invention to provide an optical information medium suitable for recording and reproducing information in high density and with reduced cross erase. Furthermore, it is another object of the present invention to provide an optical information recording medium that allows information to be recorded and reproduced with a high erasure ratio and a small level of jitter in overwriting in high density and at a high linear velocity. Furthermore, it is another object of the present invention to provide a method for producing these optical information media and a method for recording and reproducing information thereon, and an optical information recording/reproducing apparatus utilizing the optical information recording media.

A first optical information recording medium of the present invention includes a transparent substrate and a multi-layered film formed on the transparent substrate. The multi-layered film includes a lower protective layer, a recording layer that changes reversibly between different states detectable optically by irradiation of light beams, an upper protective layer, an intermediate layer and a reflective layer in this order from the side near the transparent substrate. Of the upper protective layer, the intermediate layer and the reflective layer, the heat conductivity of the layer closest to the recording layer is the smallest of the three layers, and the heat conductivities of the others of the three layers increase with increasing the distance from the recording layer. More specifically, the order of the level of the heat conductivity corresponds to the order of the distance from the recording layer. For example, the third closest layer has the third lowest heat conductivity, etc. The thickness of the recording layer is from 4 nm to 16 nm.

This embodiment of the optical information recording medium accelerates the heat conduction from the recording layer in the thickness direction of the multi-layered film, and the cross erase can be reduced. A preferable thickness of the recording layer is from 6 nm to 14 nm.

A second optical information recording medium of the present invention includes a transparent substrate and a multi-layered film formed on the transparent substrate. The multi-layered film includes a lower protective layer, a recording layer that changes reversibly between different states detectable optically by irradiation of light beams, an upper protective layer, a light absorption layer and a reflective layer in this order from the side near the transparent substrate. The difference $\Delta n = n_1 - n_2$ between the refractive index $n_1$ of the light absorption layer and the refractive index $n_2$ of the reflective layer at a wavelength $\lambda$ of the light beams is 2 to 6. The thickness of the reflective layer is not smaller than the thickness of the light absorption layer. This optical information recording medium can provide large Acry/Amo together with large $\Delta R$, and a sufficient cooling effect. As a result, an optical information recording medium that allows information to be recorded and reproduced with a high erasure ratio and a small level of jitter in overwriting in high density and at a high linear velocity can be provided.

In the second optical information recording medium, it is preferable that the light absorption layer has a thickness $d_1$ in a range of $0.1\,\lambda/(n_1 \cdot k_1) \leq d_1 \leq 1.0\,\lambda/(n_1 \cdot k_1)$, where $k_1$ is an extinction coefficient of the light absorption layer. This preferable embodiment provides satisfactory values for all of the C/N ratio, the erasure ratio, and the jitter.

A third optical information recording medium of the present invention includes a transparent substrate and a multi-layered film formed on the transparent substrate. The multi-layered film includes a lower protective layer, a recording layer that changes reversibly between different states detectable optically by irradiation of light beams, an upper protective layer, a light absorption layer and a reflective layer in this order from the side near the transparent substrate. The light absorption layer has a thickness $d_1$ in a range of $0.1\,\lambda/(n_1 \cdot k_1) \leq d_1 \leq 1.0\,\lambda/(n_1 \cdot k_1)$, where $\lambda$ is a wavelength of the light beams, and $n_1$ and $k_1$ are a refractive index and an extinction coefficient, respectively, of the light absorption layer at the wavelength $\lambda$.

The optical information recording medium of the present invention may include a plurality of recording layers, or may include two or more information layers, each of which is composed of a multi-layered film including a recording layer. In this case, it is preferable to laminate the two or more information layers via a separating layer. Such an optical information recording medium includes, for example, a transparent substrate and a multi-layered film formed on the transparent substrate, and the multi-layered film includes a first information layer, a separating layer and a second information layer in this order from the side near the transparent substrate.

When two information layers are provided as described above, it is preferable to apply the structure of the multi-layered film to the second information layer, although not limited thereto. It is important that the second information layer positioned farther from the side of the transparent substrate, to which laser light is incident, is highly sensitive. In the multi-layered film, the intermediate layer or the light absorption layer absorbs laser light as well as the recording layer, so that the temperature of the recording layer can be raised easily. Therefore, good sensitivity can be obtained. Furthermore, in the multi-layered film, the recording layer heated by laser light can be cooled easily due to the reflective layer that has a high heat conductivity. Therefore, the heat diffusion in the recording layer does not increase, and the deterioration in the cross erase characteristics can be suppressed.

A first method for producing an optical information recording medium of the present invention includes the steps of forming a multi-layered film on a transparent substrate, the multi-layered film including a lower protective layer, a recording layer that changes reversibly between different states detectable optically by irradiation of light beams, an upper protective layer, an intermediate layer and a reflective layer in this order from the side near the transparent substrate. Of the upper protective layer, the intermediate layer and the reflective layer, the heat conductivity of the layer closest to the recording layer is the smallest of the three layers, and the heat conductivities of the others of the three layers increase with increasing distance from the recording layer. The thickness of the recording layer is from 4 nm to 16 nm. This production method can provide an optical information recording medium with reduced cross erase.

A second method for producing an optical information recording medium of the present invention includes the steps of forming a multi-layered film on a transparent substrate, the multi-layered film including a lower protective layer, a recording layer that changes reversibly between different states detectable optically by irradiation of light beams, an upper protective layer, a light absorption layer and a reflective layer in this order from the side near the transparent substrate. The difference $\Delta n=n_1-n_2$ between the refractive index $n_1$ of the light absorption layer and the refractive index $n_2$ of the reflective layer at a wavelength $\lambda$ of the light beams is 2 to 6. The thickness of the reflective layer is not smaller than the thickness of the light absorption layer. This production method achieves an optical information recording medium that allows information to be recorded and reproduced with a high erasure ratio and a small level of jitter in overwriting in high density and at a high linear velocity.

A third method for producing an optical information recording medium of the present invention includes the steps of forming a multi-layered film on a transparent substrate, the multi-layered film including a lower protective layer, a recording layer that changes reversibly between different states detectable optically by irradiation of light beams, an upper protective layer, a light absorption layer and a reflective layer in this order from the side near the transparent substrate. The light absorption layer is formed so that $0.1 \lambda/(n_1 \cdot k_1) \leq d_1 \leq 1.0 \lambda/(n_1 \cdot k_1)$ is satisfied, where $d_1$ is a thickness of the light absorption layer, $\lambda$ is a wavelength of the light beams, and $n_1$ and $k_1$ are a refractive index and an extinction coefficient, respectively, of the light absorption layer at the wavelength $\lambda$.

The above-described production methods can be applied to an optical information recording medium including two or more information layers. In this case, it is preferable that the method includes the steps of forming a first information layer on a transparent substrate; forming a second information layer on a protective substrate; and attaching the transparent substrate and the protective substrate via a separating layer, thereby forming the first information layer, the separating layer and the second information layer on the transparent substrate in this order. In this case, the protective substrate can function as a layer for protecting the information layer. Furthermore, the above-described production methods can be applied to a method for producing the second information layer.

A first method for recording and reproducing an optical information recording medium of the present invention is used with an optical information recording medium including a transparent substrate and a multi-layered film formed on the transparent substrate, the multi-layered film including a lower protective layer, a recording layer that changes reversibly between different states detectable optically by irradiation of light beams, an upper protective layer, an intermediate layer and a reflective layer in this order from the side near the transparent substrate. Of the upper protective layer, the intermediate layer and the reflective layer, the heat conductivity of the layer closest to the recording layer is the smallest of the three layers, and the heat conductivities of the others of the three layers increase with increasing distance from the recording layer. The thickness of the recording layer is from 4 nm to 16 nm. The method is characterized in that when the intensity of the light beams is represented by power level Pthat can melt an irradiated portion instantly, power levels $P_2$ and $P_3$ (where $P_1 > P_2 \geq P_3 \geq 0$) that cannot melt an irradiated portion instantly, and power level $P_0$ (where $P_1 > P_0 > 0$) that does not change an optical state of a recording mark and provides reflected beams sufficient to reproduce the recording mark by irradiation, at least one recording mark to be recorded in the recording layer is formed with a recording pulse train consisting of a group of pulses generated by modulating the light beams between the power levels $P_1$ and $P_3$. When the recording mark is not to be recorded, the light beams are maintained at the power level $P_2$, and information recorded in the recording layer is reproduced by irradiating the light beams at the power level $P_0$.

Thus, it is possible to record and reproduce information while suppressing the cross erase by forming a recording mark with a pulse train generated by modulating the intensity.

A second method for recording and reproducing an optical information recording medium of the present invention is used with an optical information recording medium including a transparent substrate and a multi-layered film formed on the transparent substrate, the multi-layered film including a lower protective layer, a recording layer that changes reversibly between different states detectable optically by irradiation of light beams, an upper protective layer, a light absorption layer and a reflective layer in this order from the side near the transparent substrate. The difference $\Delta n=n_1-n_2$ between the refractive index $n_1$ of the light absorption layer and the refractive index $n_2$ of the reflective layer at a wavelength $\lambda$ of the light beams is 2 to 6, and the thickness of the reflective layer is not smaller than the thickness of the light absorption layer. The method is characterized in that when the intensity of the light beam is represented by power level $P_1$ that can melt an irradiated portion instantly, power levels $P_2$ and $P_3$ (where $P_1 > P_2 \geq P_3 \geq 0$) that cannot melt an irradiated portion instantly, and power level $P_0$ (where $P_{1>P_0}>0$) that does not change an optical state of a recording mark and provides reflected beams sufficient to reproduce the recording mark by irradiation, at least one recording mark to be recorded in the recording layer is formed with a recording pulse train consisting of a group of pulses generated by modulating the light beams between the power levels $P_1$ and $P_3$. When the recording mark is not to be recorded, the light beams are maintained at the power level $P_2$, and information recorded in the recording layer is reproduced by irradiating the light beams at the power level $P_0$.

This recording and reproducing method can remove extra heat so as to equalize the mark width, especially when a long mark is formed.

A third method for recording and reproducing an optical information recording medium of the present invention is used with an optical information recording medium including a transparent substrate and a multi-layered film formed on the transparent substrate, the multi-layered film including a lower protective layer, a recording layer that changes reversibly between different states detectable optically by irradiation of light beams, an upper protective layer, a light absorption layer and a reflective layer in this order from the side near the transparent substrate. The light absorption layer has a thickness $d_1$ in a range of $0.1 \lambda/(n_1 \cdot k_1) \leq d_1 \leq 1.0 \lambda/(n_1 \cdot k_1)$, where $\lambda$ is a wavelength of the light beams, and $n_1$ and $k_1$ are a refractive index and an extinction coefficient, respectively, of the light absorption layer at the wavelength $\lambda$. The method is characterized in that when the intensity of the light beam is represented by power level $P_1$ that can melt an irradiated portion instantly, power levels $P_2$ and $P_3$ (where $P_1 > P_2 > P_3 \geq 0$) that cannot melt an irradiated portion instantly, and power level $P_0$ (where $P_1 > P_0 > 0$) that does not change an optical state of a recording mark and provides reflected beams sufficient to reproduce the recording mark by irradiation, at least one recording mark to be recorded in the recording layer is formed with a recording pulse train consisting of a group of pulses generated by modulating the light beams between the power levels $P_1$ and $P_3$. When the recording mark is not to be recorded, the light beams are maintained at the power level $P_2$, and information recorded in the recording layer is reproduced by irradiating the light beams at the power level $P_0$.

The above-described production methods can be applied to an optical information recording medium including two or more information layers. In this case, the light beams are incident from the side of the transparent substrate, and the state of the recording layers included in the first information layer and the second information layer can be changed.

A first apparatus for recording and reproducing an optical information recording medium of the present invention includes an optical information recording medium, a light beam generator for generating light beams with which the optical information recording medium is irradiated, and a light beam intensity modulator for modulating the intensity of the light beams. The optical information recording medium includes a transparent substrate, a lower protective layer, a recording layer that changes reversibly between different states detectable optically by irradiation of light beams, an upper protective layer, an intermediate layer and a reflective layer in this order from the side near the transparent substrate. Of the upper protective layer, the intermediate layer and the reflective layer, the heat conductivity of the layer closest to the recording layer is the smallest of the three layers, and the heat conductivities of the others of the three layers increase with increasing distance from the recording layer, and the thickness of the recording layer is from 4 nm to 16 nm. When the intensity of the light beam is represented by power level $P_1$ that can melt an irradiated portion instantly, power levels $P_2$ and $P_3$ (where $P_1 > P_2 \geq P_3 \geq 0$) that cannot melt an irradiated portion instantly, and power level $P_0$ (where $P_1 > P_0 > 0$) that does not change an optical state of a recording mark and provides reflected beams sufficient to reproduce the recording mark by irradiation, in the case where information is recorded by forming a recording mark in the recording layer, the light beam intensity modulator modulates the light beams between the power levels $P_1$ and $P_3$, so as to generate a recording pulse train consisting of a group of pulses, thereby forming at least one recording mark. When the recording mark is not to be recorded, the light beam intensity modulator maintains the intensity of the light beams at the power level $P_2$. In the case where the information recorded in the recording layer is reproduced, the light beam intensity modulator maintains the intensity of the light beams at the power level $P_0$.

A second apparatus for recording and reproducing an optical information recording medium includes an optical information recording medium, a light beam generator for generating light beams with which the optical information recording medium is irradiated, and a light beam intensity modulator for modulating the intensity of the light beams. The optical information recording medium includes a transparent substrate and a multi-layered film formed on the transparent substrate, the multi-layered film including a lower protective layer, a recording layer that changes reversibly between different states detectable optically by irradiation of light beams, an upper protective layer, a light absorption layer and a reflective layer in this order from the side near the transparent substrate. The difference $\Delta n = n_1 - n_2$ between the refractive index $n_1$ of the light absorption layer and the refractive index $n_2$ of the reflective layer at a wavelength $\lambda$ of the light beams is 2 to 6, and the thickness of the reflective layer is not smaller than the thickness of the light absorption layer. When the intensity of the light beam is represented by power level $P_1$ that can melt an irradiated portion instantly, power levels $P_2$ and $P_3$ (where $P_1 > P_2 \geq P_3 \geq 0$) that cannot melt an irradiated portion instantly, and power level $P_0$ (where $P_1 > P_0 > 0$) that does not change an optical state of a recording mark and provides reflected beams sufficient to reproduce the recording mark by irradiation, in the case where information is recorded by forming a recording mark in the recording layer, the light beam intensity modulator modulates the light beams between the power levels $P_1$ and $P_3$, so as to generate a recording pulse train consisting of a group of pulses, thereby forming at least one recording mark. When the recording mark is not to be recorded, the light beam intensity modulator maintains the intensity of the light beams at the power level $P_2$. In the case where the information recorded in the recording layer is reproduced, the light beam intensity modulator maintains the intensity of the light beams at the power level $P_0$.

A third apparatus for recording and reproducing an optical information recording medium includes an optical information recording medium, a light beam generator for generating light beams with which the optical information recording medium is irradiated, and a light beam intensity modulator for modulating the intensity of the light beams. The optical information recording medium includes a transparent substrate and a multi-layered film formed on the transparent substrate, the multi-layered film including a lower protective layer, a recording layer that changes reversibly between different states detectable optically by irradiation of light beams, an upper protective layer, a light absorption layer and a reflective layer in this order from the side near the transparent substrate. The light absorption layer has a thickness $d_1$ in a range of $0.1 \lambda/(n_1 \cdot k_1) \leq d_1 \leq 1.0 \lambda/(n_1 \cdot k_1)$, where $\lambda$ is a wavelength of the light beams, and $n_1$ and $k_1$ are a refractive index and an extinction coefficient, respectively, of the light absorption layer at the wavelength $\lambda$. When the intensity of the light beam is represented by power level $P_1$ that can melt an irradiated portion instantly, power levels $P_2$ and $P_3$ (where $P_1 > P_2 \geq P_3 \geq 0$) that cannot melt an irradiated portion instantly, and power level $P_0$ (where $P_1 > P_0 > 0$) that does not change an optical state of a recording mark and provides reflected beams sufficient to reproduce the recording mark by irradiation, in the case where information is recorded by forming a recording mark in the recording layer, the light beam intensity modulator modulates the light beams between the power levels $P_1$ and $P_3$, so as to generate a recording pulse train consisting of a group of pulses, thereby forming at least one recording mark. When the recording mark is not to be recorded, the light beam intensity modulator maintains the intensity of the light beams at the power level $P_2$. In the case where the information recorded in the recording layer is reproduced, the light beam intensity modulator maintains the intensity of the light beams at the power level $P_0$.

The above-described apparatuses can be applied to an optical information recording medium including two or more information layers. In this case, the light beam generator can be provided on the side of the transparent substrate so that laser light is incident from the side of the transparent substrate.

As described above, the present invention can provide an optical information recording medium suitable for recording and reproducing information in high density and with a small level of cross erase. Furthermore, the present invention can provide an optical information recording medium that allows recording and reproducing of information with a high erasure ratio and small jitter in overwriting in high density and at high linear velocity. In addition, the present invention can provide a method for producing these optical information recording media, a method for recording and reproducing information on an optical information recording medium suitable for the media of the present invention, and an apparatus for recording and reproducing information on an optical information recording medium.

These and other advantages of the present invention will become apparent to those skilled in the art upon reading and understanding the following detailed description with reference to the accompanying figures.

DESCRIPTION OF THE PREFERRED EMBODIMENTS

Figure 1:
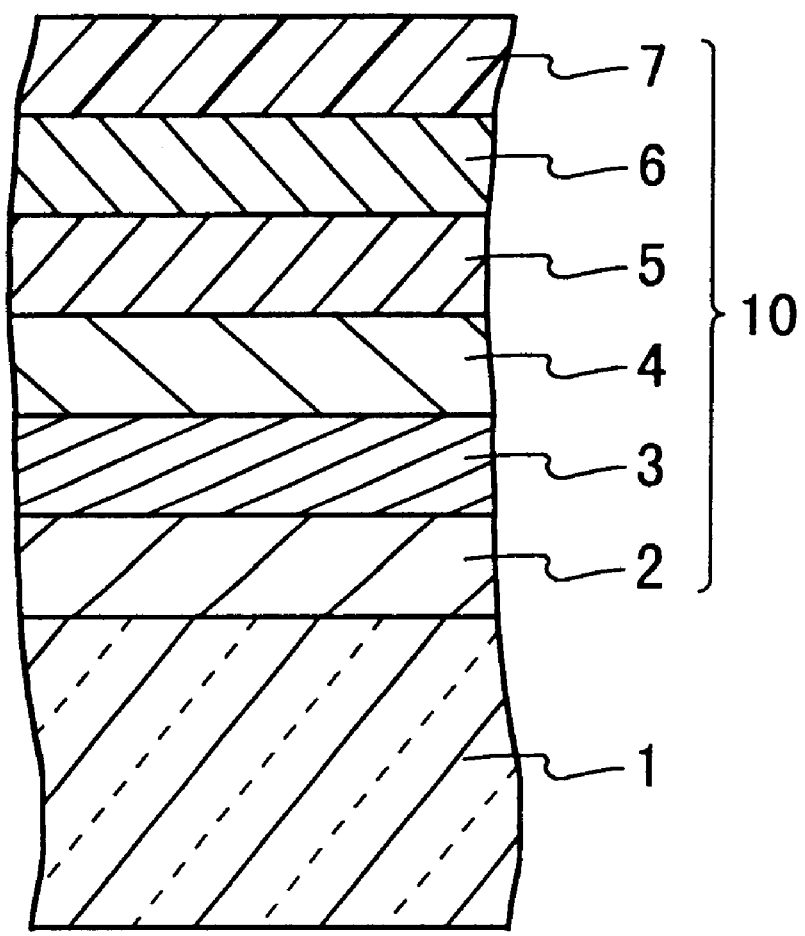
FIG. 1 is a partial cross-sectional view of an embodiment of an optical information recording medium of the present invention.

Hereinafter, preferred embodiments of the present invention will be described.

First Embodiment

In this embodiment, a first optical information recording medium of the present invention will be mainly described. As a result of the study of various layer structures of a multi-layered film formed on a substrate, the inventors found that the cross erase is influenced significantly by the relationship between the thickness of a recording layer and the heat conductivity of layers closer to the air side (the side opposite to the substrate) than the recording layer is, and achieved the medium of this embodiment.

In the optical information recording medium, the thickness of an upper protective layer preferably is 10 nm or more. When the upper protective layer is excessively thin, a distance from the recording layer and an intermediate layer is too short, so that the heat conduction from the recording layer to the intermediate layer is eventually suppressed due to an influence of heat that the intermediate layer itself has. The thickness of the upper protective layer preferably is 200 nm or less.

Furthermore, the optical information recording medium preferably further includes an interface layer formed in contact with the recording layer. The interface layer is formed at least either between the upper protective layer and the recording layer or between a lower protective layer and the recording layer. It is preferable that the interface layer comprises Ge to prevent mutual diffusion of atoms between the upper protective layer and/or the lower protective layer and the recording layer. The interface layer preferably comprises at least one selected from the group consisting of Ge, Si, Cr, Ti and Al.

Furthermore, in the optical information recording medium, it is preferable that the recording layer comprises Ge, Sb and Te, because these materials are suitable for erasing and recording performed simultaneously in the recording layer. More preferably, the recording layer comprises Ge, Sb and Te as main components and further contains 6.0 at % or less of N to improve the repetition characteristics.

Furthermore, in the optical information recording medium, it is preferable that the upper protective layer and/or the lower protective layer contain 60 to 100 mol % of ZnS and 40 to 0 mol % of $SiO_2$. Such a protective layer has excellent heat resistance, an appropriate heat conductivity and a refractive index appropriate to adjust the optical characteristics of the medium.

Furthermore, in the optical information recording medium, it is preferable that the reflective layer comprises at least one selected from the group consisting of Au, Ag, Cu and Al. Alloys comprising these metals can be used.

Furthermore, in the optical information recording medium, it is preferable that the intermediate layer comprises at least one element selected from the group consisting of Ti, Zr, Hf, V, Nb, Ta, Cr, Mo, W, Mn, Re, Fe, Ru, Os, Al, Ga, In, C, Si, Ge, Sn, Pb, Sb and Bi. More specifically, it is preferable that the intermediate layer comprises at least one compound selected from the group consisting of oxide, nitride, carbide, sulfide, fluoride, selenide and telluride comprising at least one selected from the above-mentioned elements, or a compound consisting of at least two elements selected from the above described elements such as Ge—Cr and Si—W, The intermediate layer is formed of a material having a heat conductivity between the heat conductivity of the upper protective layer and the heat conductivity of the reflective layer.

Furthermore, in the optical information recording medium, it is preferable that the reflectance difference (Rcry–Ramo) is 5% or more (5 points or more in representation by %), and the absorptance ratio (Acry/Aamo) is 1.0 or more, where Rcry and Acry are a reflectance that is a ratio of light beams reflected by the recording medium and an absorptance that is a ratio of light beams absorbed by the recording layer, respectively, when the recording layer is crystalline, and Ramo and Aamo are those when the recording layer is amorphous. This preferable example solves the problem of non-uniformity of the mark edge positions at the time of overwriting.

In a method for producing the optical information recording medium of the present invention, it is preferable that the recording layer is formed at a rate of 200 nm/min or less in order to ensure the precision in the thickness of the recording layer.

It is preferable to form the recording layer in an atmosphere containing inert gas and nitrogen gas, where the content of the nitrogen gas is adjusted so that the recording layer contains 6.0 at % or less of nitrogen atoms.

In the method for recording and reproducing information on the optical information recording medium of the present invention, it is preferable that at least a part of a recording pulse train is generated so that the pulse widths and the pulse intervals are substantially identical to other widths and intervals.

In the method for recording and reproducing information on the optical information recording medium, it is preferable to provide a cooling section of a power level $P_4$ ($P_2 > P_4 \geq 0$) immediately after the last pulse of the recording pulse train.

Hereinafter, this embodiment will be described more specifically with reference to the accompanying drawings.

Figure 2:
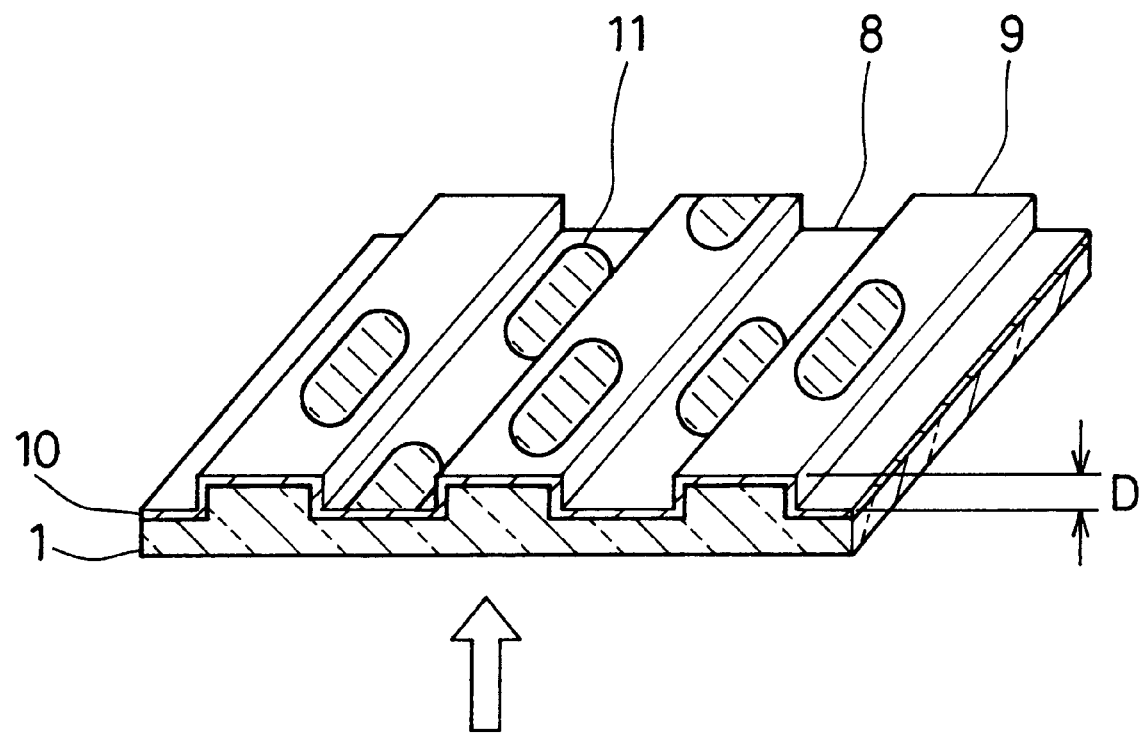
FIG. 2 is a partial perspective view of an embodiment of an optical information recording medium of the present invention.

FIGS. 1 and 2 are a partial cross-sectional view and a partial perspective view of an optical disk of this embodiment. As shown in FIG. 1, this optical disk includes a transparent disk substrate 1, a lower protective layer 2, a recording layer 3, an upper protective layer 4, an intermediate layer 5 and a reflective layer 6. These layers are laminated sequentially on the transparent disk substrate 1. In addition, an overcoat layer 7 is provided thereon. As shown in FIG. 2, since grooves 8 having a depth D are formed on the substrate 1, concave portions and convex portions, which extend in parallel to each other, are formed on the surface of a multi-layered film 10 including the above-described layers as the grooves 8 and lands 9. The recording layer 3 is irradiated with laser light as light beams from the side of the substrate 1, so as to form a recording mark 11. As shown in FIG. 2, it is preferable to form the recording marks both on the groove 8 and the land 9 to achieve high density recording (land and groove recording).

The substrate 1 can be formed of a material such as a polycarbonate resin, a polymethylmethacrylate resin, a polyolefin resin, an Arton resin, glass or the like. The thickness of the substrate 1 is not limited to a particular thickness, but a thickness of 0.1 to 2.0 mm is preferable.

The lower protective layer 2 and the upper protective layer 4 are formed to prevent increase of noise due to thermal damage to the substrate 1 or the recording layer 3 during irradiation of laser light, and to adjust the reflectance and the absorptance with respect to the laser light and the phase of reflected light. The protective layers 2 and 4 can be formed of a dielectric material such as an oxide of Sc, Y, Ce, La, Ti, Zr, Hf, V, Nb, Ta, Zn, Al, Si, Te or the like, a nitride of Ti, Zr, Hf, V, Nb, Ta, Cr, Mo, W, Zn, B, Al, Ga, In, Si, Ge, Sn, Pb or the like, a carbide of T, Zr, Hf, V, Nb, Ta, Cr, Mo, W, Zn, B, Al, Ga, In, Si or the like, a sulfide of Zn, Cd, Ga, In, Si, Ge, Sn, Pb, Sb, Bi or the like, a selenide or a telluride, a fluoride of Mg, Ca or the like, a single-element substance such as C, Si, Ge or the like, or a mixture of these.

The thickness of the upper protective layer 4 preferably is 10 nm to 200 nm. When the thickness of the upper protective layer 4 is too small, heat hardly escapes from the recording layer 3 to the intermediate layer 5 due to the heat that the intermediate layer 5 itself has, as described above. Thus, when the heat conductivity in the direction of the thickness of the layers drops, the heat diffusion in the plane of the recording layer 3 becomes large, thus leading to a possibility that the cross erase may increase. When the upper protective layer 4 is 10 nm or more, the cross erase can be in an acceptable range, even if, for example, the track pitch (which is the average of the width of a pair of adjacent land and groove (½ of a groove pitch), or is equal to a groove pitch when recording is performed only in grooves) is 0.6 µm. As the upper protective layer 4 becomes larger, the cross erase can be smaller. However, since the optical characteristics repeat by a cycle of a thickness $\lambda/2n$ ($\lambda$ is a wavelength of laser light, and n is a refractive index of the upper protective layer 4), it is industrially disadvantageous to make the thickness larger than necessary in order to obtain the desired optical characteristics of the medium. Therefore, the thickness thereof preferably is 200 nm or less, although this may depend on the wavelength $\lambda$ and the refractive index n. For the reason described above, the thickness of the upper layer 4 preferably is from 10 nm to 200 nm, and more preferably 20 nm to 200 nm.

On the other hand, the thickness of the lower protective layer 2 is not limited to a particular value, but preferably is 10 nm to 200 nm. When the thickness of the lower protective layer is less than 10 nm, the substrate may be deformed by heat. The reason why a thickness of the lower protective layer of 200 nm or less is preferable is the same as the reason why a thickness of the upper protective layer of 200 nm or less is preferable.

The recording layer 3 can be formed of an alloy comprising chalcogenide, a material based on Te or Se, such as Ge—Sb—Te, Ge—Te, Pd—Ge—Sb—Te, In—Sb—Te, Sb—Te, Ag—In—Sb—Te, Ge—Sb—Bi—Te, Ge—Sb—Se—Te, Ge—Sn—Te, Ge—Sn—Te—Au, Ge—Sb—Te—Cr, In—Se, In—Se—Co or the like, as a main component. Alternatively, a material where oxygen, nitrogen or the like is added to these alloys can be used.

The thickness of the recording layer 3 preferably is 4 nm to 16 nm. Conventionally, when the track pitch was large to the extent that the cross erase did not cause a large problem, a thickness of 20 nm or more was advantageous to achieve a large optical contrast. However, such a thick recording layer leads to large heat conduction in the in-plane direction of the recording layer. Therefore, as the track pitch becomes smaller (e.g., 0.6 µm or less), the cross erase becomes more significant. A thin recording layer is advantageous in order to reduce the cross erase. Making a thin recording layer allows the heat conduction in the in-plane direction of the layer to be reduced. For example, when the thickness of the recording layer is 16 nm or less, the cross erase can be within an acceptable range even if the track pitch is 0.6 µm. However, when the thickness of the recording layer is less than 4 nm, not only can the optical contrast not be obtained, but also the influence of thickness variation due to repetitive recording becomes large, so that tracking becomes unstable, leading to large cross erase. Therefore, the thickness of the recording layer preferably is 4 nm to 16 nm, more preferably 6 nm to 14 nm.

The intermediate layer 5 preferably is formed of a material comprising at least one element selected from the group consisting of Ti, Zr, Hf, V, Nb, Ta, Cr, Mo, W, Mn, Re, Fe, Ru, Os, Al, Ga, In, C, Si, Ge, Sn, Pb, Sb, and Bi, or a material comprising at least one compound selected from the group consisting of oxide, nitride, carbide, sulfide, fluoride, selenide and telluride of at least one selected from the above-mentioned elements. More specifically, Cr, Mo, W, Ti, Zr, Nb, Ta, Ge—Cr, Ge—Mo, Ge—W, Si—Cr, Si—Mo, Si—W or the like can be used.

The thickness of the intermediate layer 5 is not limited to a particular value, but a thickness of 5 nm to 100 nm is preferable.

The reflective layer 6 is formed to adjust the reflectance and the absorptance with respect to laser light, and the phase of reflected light, reduce the thermal load in the recording thin film, or the like. The reflective layer can be formed of a metal material having a relatively high heat conductivity such as Al, Au, Ag, Cu or the like, or an alloy material based on these metal materials.

The thickness of the reflective layer 6 is not limited to a particular value, but a thickness of 10 nm to 200 nm is preferable.

A suitable material used for each layer can be selected individually from the examples listed above. However, as for the reflective layer 6, the intermediate layer 5 and the upper protective layer 4, materials thereof are selected so that the heat conductivity of the reflective layer 6 is larger than that of the intermediate layer 5, and the heat conductivity of the intermediate layer 5 is larger than that of the upper protective layer 4. When the heat conductivity is set in such a manner, the heat conduction is accelerated from the recording layer 3 in the thickness direction of the multi-layered film. Therefore, the heat conduction in the in-plane direction of the recording layer 3 can be suppressed relatively, so that the influence on adjacent tracks can be small.

Figure 3:
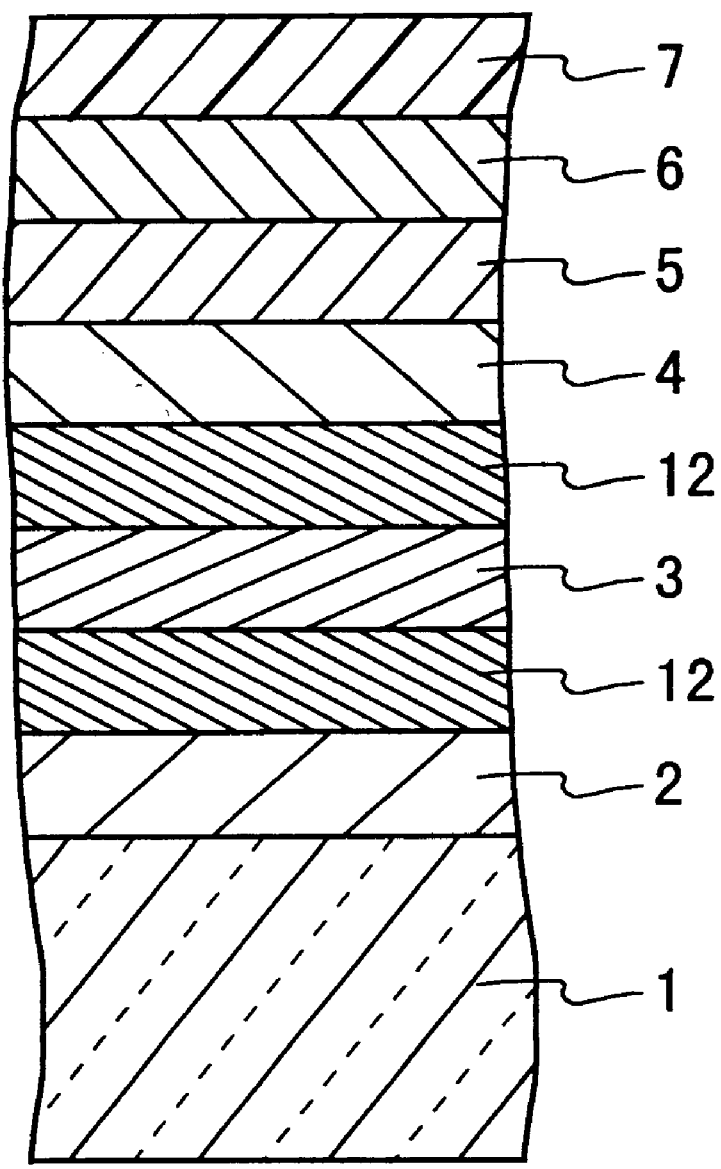
FIG. 3 is a partial cross-sectional view of another embodiment of an optical information recording medium of the present invention.

As shown in FIG. 3, an interface layer 12 can be provided in the optical information recording medium. The interface layer 12 can be provided on both sides of the recording layer 3, as shown in FIG. 3. Alternatively, the interface layer 12 can be provided on either one of the sides. The interface layer 12 can suppress atomic diffusion between the protective layers 2 and 4 and the recording layer 3, so that the repetition characteristics of the recording medium can improve. The interface layer 12 can be formed of a material having a diffusion preventing effect with respect to the materials for the protective layers 2 and 4. A material comprising Ge is preferable, and a material comprising a nitride of Ge as a main component is most preferable.

The thickness of the interface layer 12 is not limited to a particular value, but a thickness of 1 nm to 50 nm is preferable.

The layers 2 to 6, and 12 can be formed by a vapor thin film deposition method such as a vacuum evaporation method, sputtering, ion plating, a CVD (chemical vapor deposition) method, an MBE (molecular beam epitaxy) method or the like. Among these, sputtering is most preferable when the advantages and the disadvantages in the film formation rate, the production cost and the quality of the obtained film are balanced. Each layer generally is formed while allowing inert gas to flow in a chamber under high vacuum. The layer can be formed while mixing oxygen, nitrogen or the like with the inert gas. Thus, oxygen atoms or nitrogen atoms are contained in the film so that the characteristics of the film can be adjusted. Especially in the recording layer 3, the mixture of these atoms (e.g., the mixture of 6.0 at % or less of nitrogen atoms) may be effective to improve the repetition characteristics of the medium or reduce the cross erase.

For the optical information recording medium, it is industrially advantageous to form the layers 2 to 6 and 12 in separate chambers in parallel and sequentially by a single wafer processing film-forming apparatus. In the case where this film-forming method is used, even if the recording layer is formed at a relatively low rate, that does not affect the efficiency of the whole formation of the films. This is because the thickness of the recording layer 3 is 4 nm to 16 nm and it is, for example, about one order of magnitude smaller than a normal thickness (100 nm or more) of the lower protective layer 2. Since it is important to control the thickness of the recording layer 3 precisely in order to reduce the cross erase, as described above, it is preferable to take at least about 5 seconds to form the recording layer. Thus, a film-forming rate for the recording layer of 200 nm/min. or less is preferable.

An overcoat layer 7 may be provided on the thus formed layers, as shown in FIG. 1. The layer 7 preferably is formed by coating an ultraviolet curable resin.

However, the optical information recording medium is not limited to the single plate one-sided disk as shown in FIG. 1, and can be a two-sided disk formed by attaching substrates on which multi-layered films including the recording layers are formed as described above so that the surfaces of the films are opposed to each other with a ultraviolet curable resin and/or a hot-melt type adhesive. In this case, it is preferable to attach the substrates via a separating layer to prevent the multi-layered films, each of which functions as an information layer, from being in direct contact with each other. Alternatively, the present invention can be a one-sided disk by attaching a dummy substrate onto the surface on which the multi-layered film is formed via the adhesive as described above.

Figure 4:
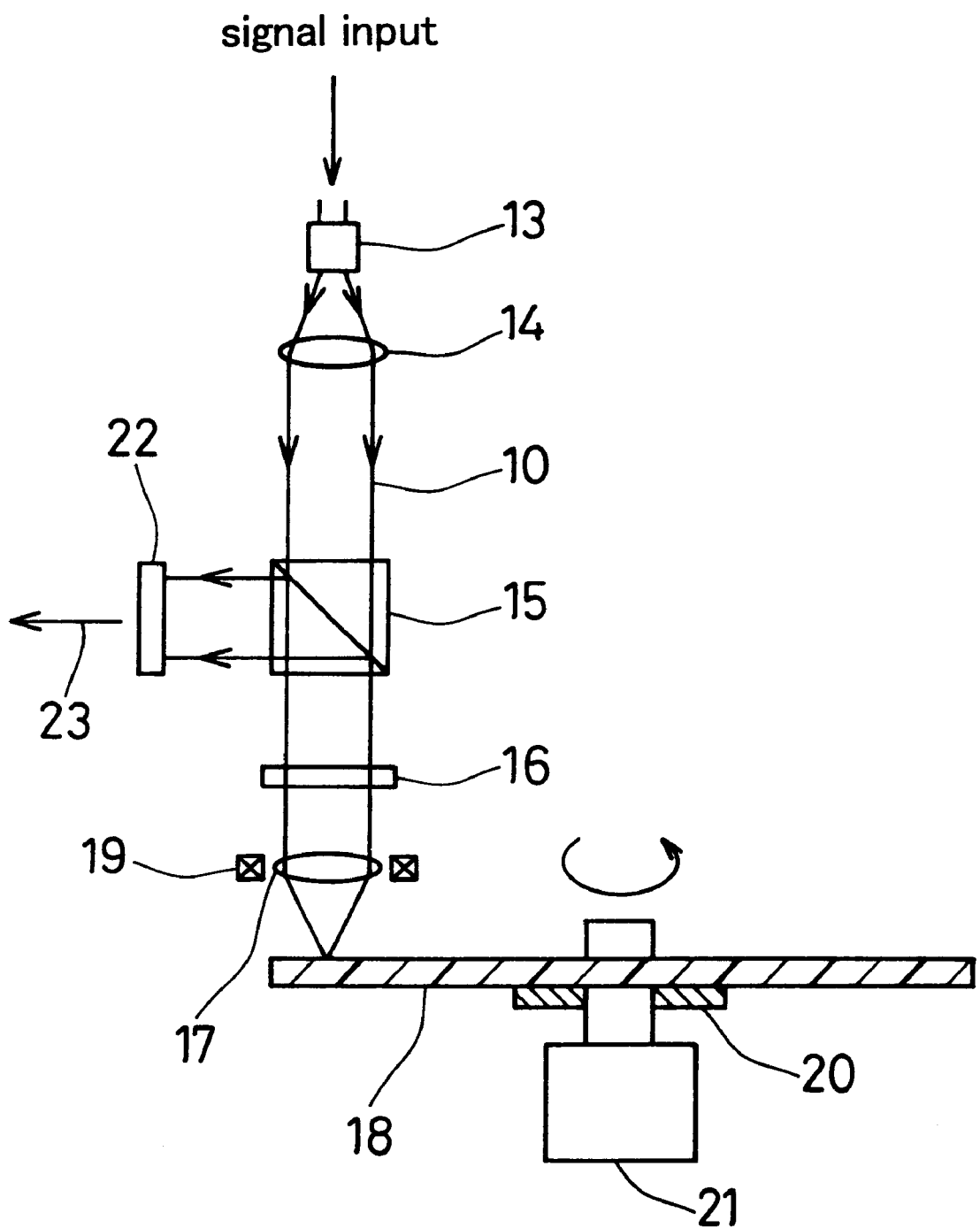
FIG. 4 is a drawing showing the structure of an embodiment of an optical information recording/reproducing apparatus of the present invention.

FIG. 4 is a schematic view of an example of an apparatus for recording and reproducing information on the optical information recording medium of the present invention. Laser light 10 emitted from a semiconductor laser 13 in accordance with an input signal is collimated by collimate lens 14 into parallel beams, and then passes through a beam splitter 15, a quarter-wave plate 16, and an object lens 17 sequentially, and then an optical disk 18 is irradiated with the light beams. The laser light 10 is focused by moving a voice coil 19 upward or downward. The optical disk 18 is secured onto a turn table 20. Information signals are recorded and reproduced by irradiating the optical disk 18 that is rotated at a predetermined rate by a motor 21 with the laser light.

Figure 5:
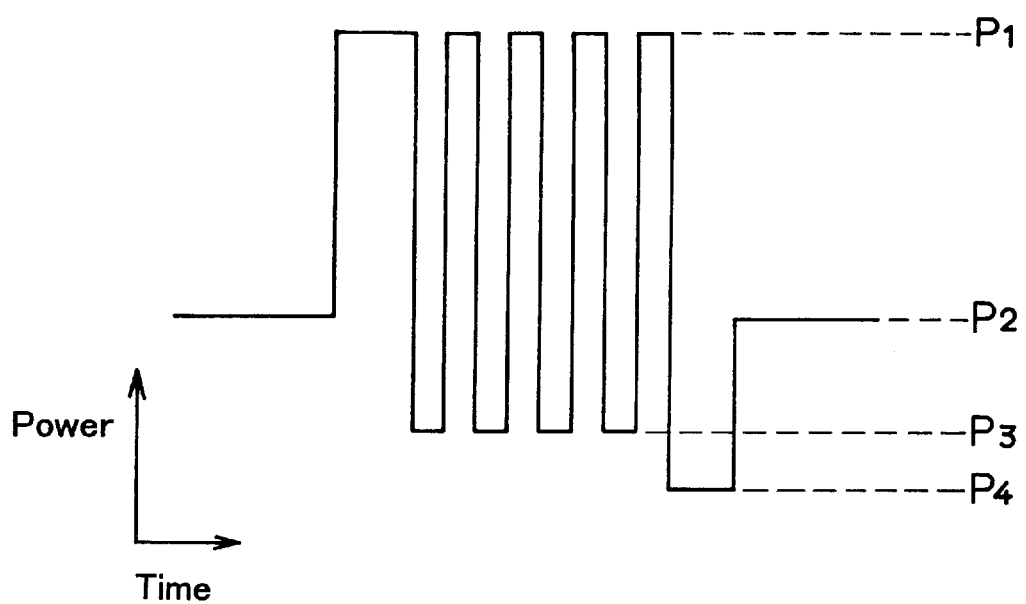
FIG. 5 is a waveform chart applied to a method for recording and reproducing information on the optical information recording medium of the present invention.

FIG. 5 is an example of a pulse waveform of the laser light for recording of information signals. As shown in FIG. 5, the intensity of the laser light is modulated among $P_1$, $P_2$, $P_3$ and $P_4$. $P_1$ is a power level that allows the irradiated portion to be melted instantly, and preferably, a power level that allows the irradiated portion to be melted instantly even if the portion is irradiated while modulating the intensity at power levels equal to or less than this power level, as shown in FIG. 5. $P_2$ and $P_3$ are power levels that do not allow the irradiated portion to be melted instantly, and preferably that do not allow the irradiated portion to be melted instantly even if the portion is irradiated without modulating the intensity. $P_4$ is a power level for cooling the recording layer immediately after the last recording pulse train. FIG. 5 shows an example where the power levels are set so that $P_1 > P_2 \geq P_3 \geq P_4 \geq 0$. The intensity of the laser beam can be modulated in the manner described above by modulating the driving current of a semiconductor laser. Alternatively, an electro-optical modulator, an acousto-optical modulator or the like can be used.

However, it is not necessary to form all recording marks with the recording pulse train as shown in FIG. 5, and a pulse train for a short mark length can be formed with a single rectangular pulse of power level $P_1$. However, it is preferable to form a long mark with the pulse train including the power level $P_1$ as a power peak so that excessive heat can be suppressed in order to improve the repetition characteristic and reduce the cross erase.

$P_2$ is a power level at which a recording mark cannot be formed even if light beam is maintained at this intensity for irradiation, as shown in FIG. 5. A power level that cannot form a recording mark but can erase a recording mark can be set as the power level $P_2$. In this case, a recording mark in a portion irradiated with light beams at the power level $P_2$ is erased.

For example, in a phase change type optical disk, when an amorphous state is used as the recorded state, and a crystalline state is used as the erased state, a power level that can change the recording layer reversibly from the crystalline state to the amorphous state can be set as $P_2$ and a power level that can change the recording layer reversibly from the amorphous state to the crystalline state can be set as $P_2$.

A cooling section at power level $P_4$ is provided immediately after the recording pulse train as shown in FIG. 5. When the power level for cooling is provided, heat can be removed in a mark rear end portion, which especially tends to have excessive heat, thus suppressing the cross erase.

As the recording pulse train as shown in FIG. 5, when the width and the length of pulses other than the first and the last pulses are constant, modulation can be performed with a signal frequency so that modulation means can be simplified.

Furthermore, mark edge positions may be non-uniform for each pattern of the length of a recording mark, the length of a space before and after the recording mark, and the length of an adjacent mark, thus causing an increase of jitter. In the method for recording and reproducing information on the optical information recording medium of the present invention, it is preferable to adjust and compensate the pulse position or the pulse length of the pulse train, if necessary, so as to make the edge positions uniform for every pattern in order to prevent the increase of jitter and improve the jitter.

Information signals recorded in this manner are reproduced by irradiating the optical disk with laser light (non-modulated light) of power level $P_0$ at which the recording layer 3 is not phase changed, and allowing reflected light thereof to be incident to a detector 22 and detecting a change in the amount of the reflected light as a reproduction signal 23.

The power level of the laser light can be changed, as described above, by controlling the driving current of the laser diode. Furthermore, an electro-optical modulator, an acousto-optical modulator or the like can be used as the light beam intensity modulating means.

Second Embodiment

In this embodiment, a second and a third optical information recording medium of the present invention will be mainly described.

In the optical information recording medium, it is preferable to provide an interface layer at least at one interface between a lower protective layer and a recording layer and between a recording layer and an upper protective layer. This preferable example improves the erasing characteristics. It is preferable that the interface layer comprises at least one selected from the group consisting of Ge, Si, Cr, Ti and Al.

In the optical information recording medium, the thickness of the recording layer preferably is 4 nm to 16 nm. When the recording layer is excessively thin, the optical contrast or the signal amplitude becomes small. When it is too thick, the heat diffusion in the direction of the in-plane of the recording layer becomes large, thus resulting in large thermal interference between marks.

In the optical information recording medium, the thickness of the upper protective layer preferably is 10 nm to 200 nm. When the upper protective layer is excessively thin, heat generation due to light absorption of a light absorption layer affects the recording layer, thus resulting in large thermal interference between marks. When it is too thick, a cooling effect by a reflective layer becomes small, thus resulting in imbalance between the front end and the rear end of a mark. The thickness of the lower protective layer 2 is not limited to a particular value, but preferably is 10 nm to 200 nm.

In the optical information recording medium, the recording layer preferably comprises Ge, Sb and Te, and more preferably comprises Ge, Sb and Te as main components and further comprises 6.0 at % of N.

In the optical information recording medium, the upper protective layer and/or the lower protective layer preferably comprises 60 to 100 mol % of ZnS and 40 to 0 mol % of $SiO_2$.

In the optical information recording medium, the reflective layer preferably comprises at least one selected from the group consisting of Au, Ag and Cu.

Furthermore, in the optical information recording medium, it is preferable that the light absorption layer comprises at least one element selected from the group consisting of Ti, Zr, Hf, V, Nb, Ta, Cr, Mo, W, Mn, Os, Al, Ga, In, C, Si, Ge, Sn, Pb, Sb and Bi. More specifically, it is preferable that the light absorption layer comprises at least one compound selected from the group consisting of oxide, nitride, carbide, sulfide, fluoride, selenide and telluride comprising at least one selected from the above-mentioned elements, or a compound consisting of at least two elements selected from the above described elements.

Furthermore, in the optical information recording medium, it is preferable that the reflectance difference (Rcry−Ramo) is 5% or more (5 points or more in representation by %), and the absorptance ratio (Acry/Aamo) is 1.0 or more, where Rcry and Acry are a reflectance that is a ratio of light beams reflected by the recording medium and an absorptance that is a ratio of light beams absorbed by the recording layer, respectively, when the recording layer is crystalline, and Ramo and Aamo are those when the recording layer is amorphous. This preferable example solves the problem of non-uniformity of the mark edge positions at the time of overwriting.

Furthermore, in a method for producing the optical information recording medium of the present invention, it is preferable that the recording layer is formed at a rate of 200 nm/min or less in order to ensure the precision in the thickness of the recording layer.

It is preferable to form the recording layer in an atmosphere containing inert gas and nitrogen gas, where the content of the nitrogen gas is adjusted so that the recording layer contains 6.0 at % or less of nitrogen atoms.

In a method for recording and reproducing information on the optical information recording medium of the present invention, it is preferable that at least a part of a recording pulse train is generated so that the pulse widths and the pulse intervals are substantially identical to other widths and other intervals.

In the method for recording and reproducing information on the optical information recording medium, it is preferable to provide a cooling section of a power level $P_4 (P_2 > P_4 \geq 0)$ immediately after the last pulse of the recording pulse train. This preferable example is effective because heat can be removed in a mark rear end portion, which especially tends to have excessive heat.

Hereinafter, this embodiment will be described more specifically with reference to the accompanying drawings.

Figure 6:
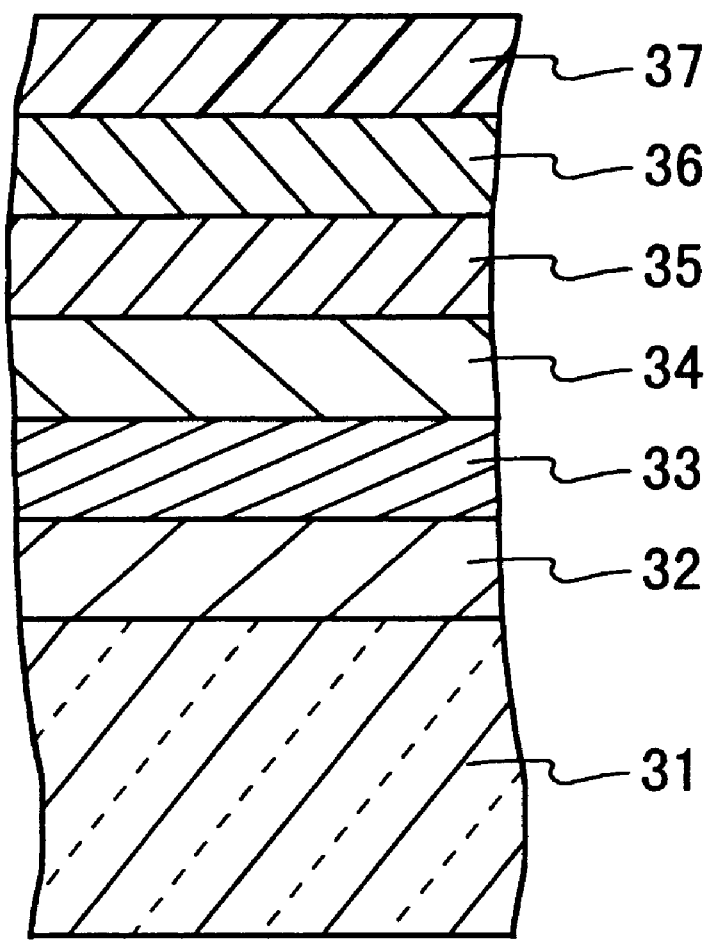
FIG. 6 is a partial cross-sectional view of still another embodiment of an optical information recording medium of the present invention.
Figure 6:
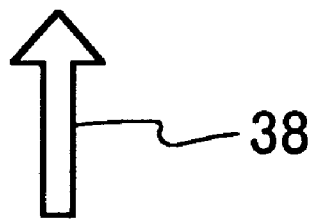
Figure 7:
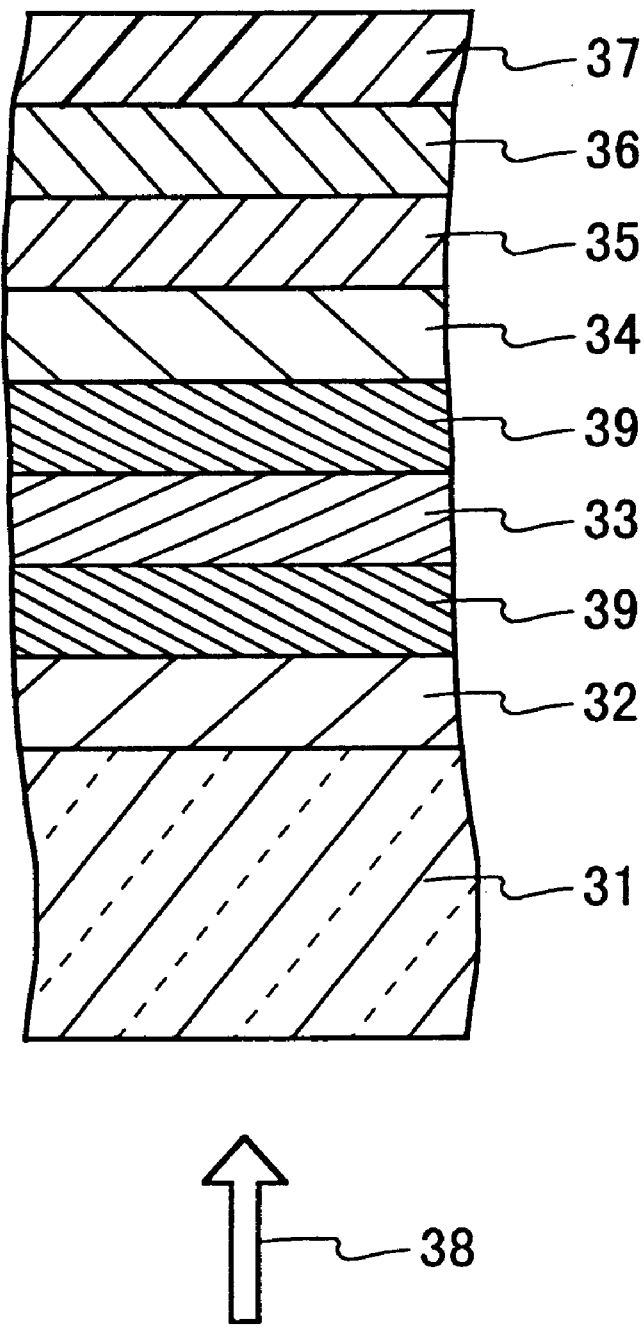
FIG. 7 is a partial cross-sectional view of yet another embodiment of an optical information recording medium of the present invention.

FIG. 6 is a partial cross-sectional view of an optical information recording medium of this embodiment. FIG. 7 is a partial cross-sectional view of another example of an optical information recording medium of this embodiment.

As shown in FIG. 6, a lower protective layer 32, a recording layer 33, an upper protective layer 34, a light absorption layer 35 and a reflective layer 36 are laminated sequentially on a substrate 31. Further, an overcoat layer 37 is provided on the reflective layer 36. This disk is irradiated with laser beam 38 from the side of the substrate 31 for recording and reproduction of the disk.

The substrate 31, the lower protective layer 32, the recording layer 33 and the upper protective layer 34 can be formed of the materials described with reference to the first embodiment.

The light absorption layer 35 is formed in order to adjust the reflectance and the absorptance with respect to the laser light 38 and the phase of reflected light, or the like. It is preferable that the light absorption layer comprises at least one selected from the group consisting of Ti, Zr, Hf, V, Nb, Ta, Cr, Mo, W, Mn, Re, Fe, Ru, Os, Al, Ga, In, C, Si, Ge, Sn, Pb, Sb and Bi, or a material comprising at least one compound selected from the group consisting of oxide, nitride, carbide, sulfide, fluoride, selenide and telluride comprising at least one selected from the above-mentioned elements. More specifically, Cr, Mo, W, Si, Ge, Te, Ge—Cr, Ge—Mo, Ge—W, Si—Cr, Si—Mo, Si—W, Ge—Te, Sn—Te, Pb—Te, Sb—Te, Bi—Te or the like can be used. For the above-listed compounds, materials in the vicinity of the stoichiometric composition can be used, or materials that are outside of the stoichiometric composition can be used, if necessary. This point also applies to the intermediate layer, etc. in the first embodiment.

The reflective layer 36 is formed to adjust the reflectance and the absorptance with respect to the laser beam 38 and the phase of reflected light, reduce the thermal load in the recording thin film, or the like. The reflective layer preferably is formed of a metal material having a relatively high heat conductivity such as Al, Au, Ag, Cu or the like, especially Au, Ag, Cu, which have a refractive index of less than 0.5 at a wavelength in the 600 nm range, or an alloy material based on these metal materials. Above all, an Ag alloy is excellent in the heat conductivity and the optical constant, and is less expensive than Au having equal characteristics. In particular, a material containing 10 at % or less of Pd, Cu, Ti or the like in addition to Ag hardly is corroded, and is preferable in view of environmental resistance and reliability.

Furthermore, in the optical information recording medium, as shown in FIG. 7, it is preferable to provide an interface layer 39 between the lower protective layer 32 and the recording layer 33 and/or the recording layer 33 and the upper protective layer 34 for the purpose of accelerating the crystallization of the recording layer 33. Among the materials used for the lower protective layer 32 and the upper protective layer 34, there are some dielectric materials that function as the interface layer 39. The interface layer 39 can be formed of one of those materials, but especially a material comprising a nitride of Ge as a main component is most preferable. Furthermore, such an interface layer 39 can improve the erasing characteristics.

The protective layer 32, the recording layer 33, the upper protective layer 34, the light absorption layer 35, the reflective layer 36 and the interface layer 39 can be formed in the same manner as in the first embodiment.

Furthermore, as shown in FIG. 6, the optical information recording medium can be a single plane one-sided disk by being overcoated with a ultraviolet curable resin. Furthermore, the optical information recording medium of this embodiment can be used as a two-sided disk, as described in the first embodiment. In addition, the optical information recording medium of this embodiment can be used as a one-sided disk by attaching a dummy substrate to the surface of the film so that they are opposed to each other.

The optical information recording medium of this embodiment is characterized by a combination of the materials and the thicknesses of the light absorption layer 35 (having a refractive index $n_1$, an extinction coefficient $k_1$, and an thickness $d_1$) and the reflective layer 36 (having a refractive index $n_2$, an extinction coefficient $k_2$, and an thickness $d_2$). Hereinafter, the function and the effect of each layer will be described.

Optically, when the refractive index $n_1$ of the light absorption layer 35 is appropriately larger than the refractive index $n_2$ of the reflective layer 36, both Acry/Aamo and $\Delta R$ can be large. The difference in the refractive index $\Delta n = n_1 - n_2$ preferably is 2 to 6, and more preferably 3 to 5.

The above-described ranges can be supported by the following optical calculation: The refractive index, the extinction coefficient and the thickness of each layer of the multi-layered film are determined. With respect to all the interfaces, an equation for light energy at each interface is formulated based on the law of the conservation of energy, and the simultaneous equations for all the interfaces are solved, so that the reflectance and the transmissivity of the entire multi-layered film and the absorptance of each layer can be calculated. This approach is well-known, for example, as a matrix method (e.g., "Wave Optics" by Hiroshi Kubota et al., Iwanami Shoten, 1971). Herein, Acry/Aamo and $\Delta R$ were calculated with respect to a multi-layered structure medium including the substrate 31/the lower protective layer 32 (an arbitrary thickness)/the recording layer 33 (10 nm)/the upper protective layer 34 (arbitrary thickness)/the light absorption layer 35 (thickness $d_1$)/the reflective layer 36 (80 nm) from the side to which laser beam (a wavelength of 660 nm) is incident.

In this case, the calculation was performed with the following refractive index n and extinction coefficient k: $n=1.6$ and $k=0.0$ for the substrate 31; $n=2.1$ and $k=0.0$ for the lower protective layer 32; $n=4.1$ and $k=1.6$ in the crystalline state of the recording layer 33; $n=3.9$ and $k=4.2$ in the amorphous state thereof; $n=2.1$ and $k=0.0$ for the upper protective layer 34; $n=n_1$ and $k=k_1$ for the light absorption layer 35; and $n=n_2$ and $k=k_2$ for the reflective layer 36.

With respect to various combinations of $n_1$ and $n_2$, the maximum value of $\Delta R$ in the range of Acry/Aamo $\geq 1.0$ was calculated, while changing $k_1$, $k_2$, and $d_1$ arbitrarily. Table 1 shows the results. In Table 1 below, "A" and "B" are expected to provide a recording medium with sufficient characteristics for practical use, "C" possibly provides a recording medium with sufficient characteristics for practical use, depending on the specification of the density, linear velocity, the recording and reproducing system or the like, and "D" fails to provide a practical recording medium. More specifically, "A" shows that the maximum value of $\Delta R$ that satisfies the requirement Acry/Aamo$\geq 1.0$ is 15% or more in some structures. "B" shows that the maximum value of $\Delta R$ that satisfies the requirement is 10% or more and not more than 15% in some structures. "C" shows that the maximum value of $\Delta R$ that satisfies the requirement is 5% or more and not more than 10% in some structures. "D" shows that there are no structures where the maximum value of $\Delta R$ that satisfies the requirement is 5% or more.

TABLE 1

| $n_2 \setminus n_1$ | 1 | 2 | 3 | 4 | 5 | 6 |
|---|---|---|---|---|---|---|
| 1 | D | D | B | A | A | A |
| 2 | D | D | D | B | A | A |
| 3 | D | D | D | C | A | A |
| 4 | D | D | D | D | C | B |
| 5 | D | D | D | D | D | C |

The results shown in Table 1 indicate that $\Delta n = n_1 - n_2$ preferably is at least two, and more preferably at least three.

When the thickness of the light absorption layer 35 is excessively small, the optical effect of the light absorption layer 35 is small. When the thickness of the light absorption layer 35 is excessively large, the optical effect of the reflective layer 36 is small. Therefore, it is necessary to make the thickness of the light absorption layer 35 so that incident light is transmitted and reflected appropriately. The experimental results of the examples that will be described later confirmed that a preferable range of the thickness $d_1$ of the light absorption layer 35 is $0.1\ \lambda/(n_1 \cdot k_1) \leq d_1 \leq 1.0\ \lambda/(n_1 \cdot k_1)$, where $\lambda$ is a wavelength of incident light, and more preferably $0.2\ \lambda/(n_1 \cdot k_1) \leq d_1 \leq 0.8\ \lambda/(n_1 \cdot k_1)$.

In order to obtain a cooling ability, a material having a large heat conductivity is used for the reflective layer 36, so that the mark widths are uniform to reduce jitter. The heat conductivity of the reflective layer preferably is, for example, 50 W/m·K or more under temperature conditions in the vicinity of 300K, more preferably 100 W/m·K or more, and most preferably 150 W/m·K or more. In order to obtain a further sufficient cooling ability, the experimental results of the examples that will be described later confirmed that the thickness $d_2$ of the reflective layer 36 preferably is equal to or more than the thickness $d_1$ of the light absorption layer 35, more preferably 1.5 times the thickness $d_1$ or more, and most preferably twice the thickness $d_1$ or more.

The method for producing the optical information recording medium, the method for recording and reproducing information thereon, and the apparatus for recording and reproducing information thereon in this embodiment are the same as those in the first embodiment.

In the example above, the thickness of the recording layer was 10 nm, but the present invention is not limited thereto.

Third Embodiment

In this embodiment, an optical information recording medium comprising at least two multi-layered films including a recording layer will be described. Herein, two layers of multi-layered films (information layer), each of which includes a recording layer, are formed via a separating layer.

Figure 8:
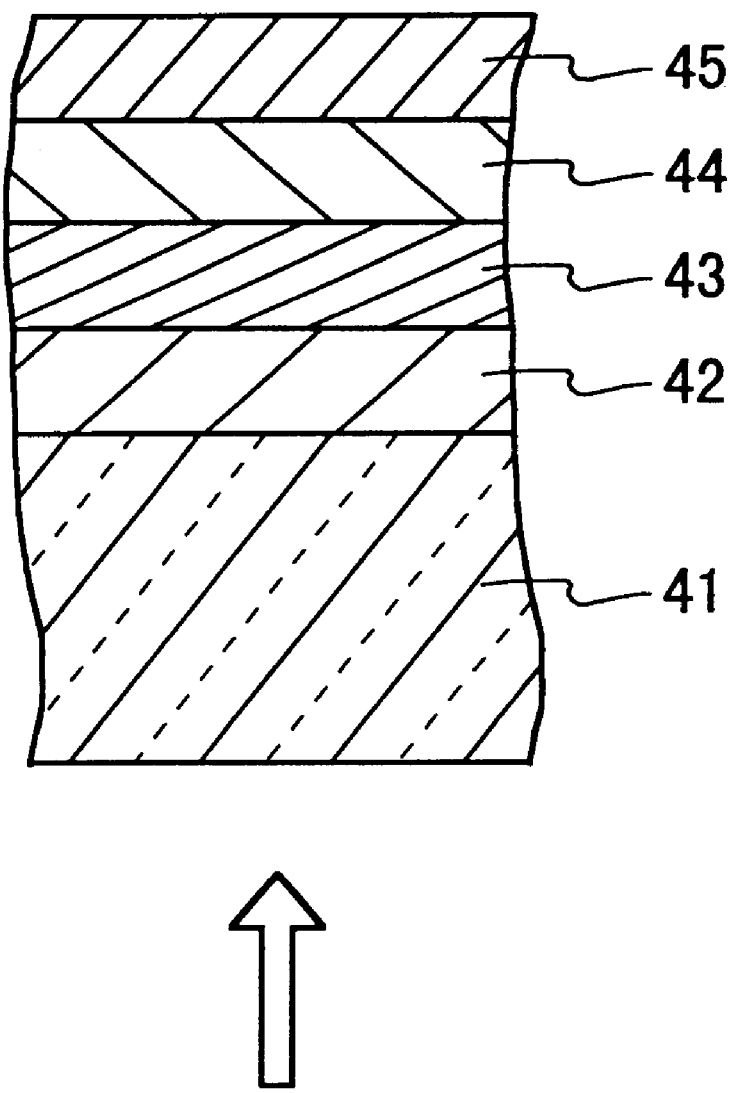
FIG. 8 is a partial cross-sectional view of another embodiment of an optical information recording medium of the present invention.

As shown in FIG. 8, in the optical information recording medium of this embodiment, a first information layer 42, a separating layer 43, a second information layer 44, and a protective layer 45 are formed on a transparent substrate 41 in this order. Each of the first information layer 42 and the second information layer 44 includes a recording layer. The recording layers are irradiated with laser light from the side of the transparent substrate so that information is recorded and reproduced.

For the second information layer 44 of this embodiment, the multi-layered film as described in the above embodiments can be applied. For the first information layer 42, it is preferable to use a multi-layered film including a recording layer, a lower protective layer and an upper protective layer provided on both sides of the recording layer. Each layer and a transparent substrate included in these multi-layered films can be formed of the materials as described in the above embodiments. The first information layer may be a read-only layer for reproducing information that already has been stored as concave-convex patterns on the surface of a transparent substrate.

Furthermore, it is preferable that the first information layer 42 transmits at least 30% of laser light irradiated because information is recorded and reproduced in the second information layer 44.

For the separating layer 43, it is preferable to use a material that is transparent at a wavelength $\lambda$ of laser light and has excellent heat resistance and adhesion. More specifically, an adhesive resin (e.g., ultraviolet curable resin), a double-sided adhesive tape, and other various dielectric films can be used. The thickness of the separating layer 43 preferably is not less than 2 μm so that at the time of recording or reproducing information on either one of the first information layer 42 or the second information layer 44, information in the other information layer does not leak thereto. On the other hand, the thickness of the separating layer 43 preferably is not more than 100 μm so that the total thickness of the separating layer and the substrate is in a substrate thickness tolerance zone in order to focus the laser light on both of the first information layer 42 and the second information layer 44.

The protective layer 45 can be utilized as a substrate (protective substrate) on which the second information layer 44 is formed. In this case, the transparent substrate 41 on which the first information layer 42 is formed and the protective substrate on which the second information layer 44 is formed are attached via the separating layer 43 to produce an optical disk. Although the same material as that of the transparent substrate 41 can be used as the material of the protective substrate, it is not necessary to be transparent, and other materials can be used. As for the shape of the surface of the substrate, it is not necessary to use the same shape as that of the surface of the transparent substrate. For example, the shape of the guide grooves consisting of grooves and lands can be different, or the spiral direction of the guide grooves can be opposite. Furthermore, if a guide groove is formed on the surface of the separating layer on the side of the second information layer, for example, by a 2P (photo-polymerization) method, the surface of the protective substrate may be smooth. Furthermore, the protective layer 45 may be formed on the second information layer 44 formed on a transparent substrate. Such a protective layer can be formed by attaching a resin sheet, for example by spin coating or with an adhesive.

An example of a production method of this embodiment will be described. The first information layer and the second information layer are formed on the surfaces of the transparent substrate and the protective substrate on each of which guide grooves are formed by sputtering or the like, as described above. Then, an ultraviolet curable resin is applied onto the surface of the first information layer and the second information layer so as to form the separating layer. Furthermore, the transparent and the protective substrate that are pressed so that the first information layer and the second information layer are opposed to each other via the separating layer, and irradiated with ultraviolet rays so as to cure the separating layer.

EXAMPLES

Hereinafter, the present invention will be described more specifically by way of examples. However, the present invention is not limited to the following examples.

Example 1

A polycarbonate resin having a thickness of 0.6 mm was used as a substrate. Lands and grooves, each of which has a width of 0.6 μm, were formed on the substrate. The depth of the groove was about 70 nm.

Lower protective layers having a thickness of about 1200 nm were formed with a target of ZnS—SiO$_2$ (the ratio in the number of molecules ZnS:SiO$_2$=80:20) on the substrate. Recording layers with various thicknesses were formed thereon with a target of Ge—Sb—Te (the ratio in the number of atoms Ge:Sb:Te=22:25:53). Upper protective layers with various thicknesses were formed thereon with a target of ZnS—SiO$_2$ (the ratio in the number of molecules ZnS:SiO$_2$=80:20). Intermediate layers having a thickness of about 40 nm were formed thereon with targets of various materials. Reflective layers having a thickness of about 40 nm were formed with thereon targets of various materials. These layers were formed by sputtering and laminated one after another. The sputtering targets for all the layers had a diameter of 10 cm and a thickness of 6 mm. All the layers except the recording layer were formed in an Ar gas, and the recording layer was formed in a mixed gas of Ar and $N_2$ (a total pressure of 2 mTorr and a partial pressure of $N_2$ gas of about 5%).

The thus obtained optical disks were overcoated with an ultraviolet curable resin, and annealed with laser light so that the entire surface was crystallized for initialization. Thus, optical disks Nos. 1 to 21 were produced. These optical disks were produced by intentionally changing the thicknesses of the recording layer and the upper protective layer and the materials of the intermediate layer and the reflective layer in order to investigate the dependence of cross erase on the material and the thickness structure.

Table 2 shows the thicknesses of the recording layer and the upper protective layer and the materials of the intermediate layer and the reflective layer of each optical disk.

Mark edge recording was performed at a linear velocity of 6.0 m/s (the radius position is at about 32 mm and the rotation number is about 1800 rpm) on these optical disks using an optical system with a wavelength of 660 nm and an NA of 0.6, and cross erase was measured.

More specifically, first, a 3T signal with 9.7 MHz was recorded on a groove, and this track was reproduced so as to measure an amplitude $A_0$ of the 3T signal with a spectrum analyzer. Then, an 11T signal with 2.6 MHz was recorded on lands adjacent to the groove on both sides, and the groove was reproduced again so as to measure an amplitude $A_1$ of the 3T signal with the spectrum analyzer. The thus measured drop amount $\Delta A = A_1 - A_0$ of the amplitude of the 3T signal was used as the index for cross erase evaluation. The same operations were performed except that the land and the groove are used in the other way around, and the drop amount $\Delta A'$ of the amplitude of the 3T signal was measured.

Table 2 shows the evaluation grade based on the value of $\Delta A$ of each disk. The results of the measurement above showed that for all the samples, the drop amount of the amplitude of the 3T signal was larger when the groove was used as the track to be measured ($\Delta A > \Delta A'$). Therefore, the evaluation was based on only the results ($\Delta A$) of that case. The sample having a value of $\Delta A$ of less than 1 dB is shown by "A", the sample having a value of $\Delta A$ of 1 dB or more and less than 2 dB is shown by "B", the sample having a value of $\Delta A$ of 2 dB or more and less than 5 dB is shown by "C", and the sample having a value of $\Delta A$ of 5 dB or more is shown by "D".

As for the laser modulation waveform for recording the signal, a single rectangular pulse with a pulse width of 51.3 ns (powder level $P_1$) was used for the 3T signal. For the 11T signal, a pulse train consisting of 9 pulses (powder level $P_1$) was used. The pulse width of the leading pulse in the pulse train was 51.3 ns, the pulse width of all the pulses other than the leading pulse was 17.1 ns, and the width between the pulses was 17.1 ns (powder level $P_3$). In addition, a cooling section of 34.2 ns (powder level $P_4$) was provided immediately after the last pulse. For a portion where no mark is to be recorded, continuous light (non-modulated light) at power level $P_2$ was used.

The recording power level $P_1$ was 1.5 times the lower limit of powers that allow the C/N ratio of the recorded 3T signal to exceed 45 dB. The power level $P_2$ was the median in the range of powers that allow the erasure ratio, which is a damping ratio in the amplitude of the 3T signal when the 11T signal is overwritten on the recorded 3T signal, to exceed 25 dB. The power levels $P_3$ and $P_4$ were 1 mW, which was equal to the reproducing power level.

TABLE 2

| No. | recording layer | upper protective layer | intermediate layer material | reflective layer material | $\Delta A$ |
|---|---|---|---|---|---|
| 1 | 4 nm | 15 nm | Cr | Al | C |
| 2 | 8 nm | 15 nm | Cr | Al | A |
| 3 | 12 nm | 15 nm | Cr | Al | B |
| 4 | 16 nm | 15 nm | Cr | Al | C |
| 5 | 20 nm | 15 nm | Cr | Al | D |
| 6 | 12 nm | 3 nm | Cr | Al | D |
| 7 | 12 nm | 6 nm | Cr | Al | D |
| 8 | 12 nm | 9 nm | Cr | Al | C |
| 9 | 12 nm | 12 nm | Cr | Al | B |
| 10 | 12 nm | 18 nm | Cr | Al | B |
| 11 | 12 nm | 21 nm | Cr | Al | A |
| 12 | 12 nm | 15 nm | PbTe | Al | A |
| 13 | 12 nm | 15 nm | $WSi_2$ | Al | A |
| 14 | 12 nm | 15 nm | Ti | Al | B |
| 15 | 12 nm | 15 nm | Cr | $WSi_2$ | D |
| 16 | 12 nm | 15 nm | Cr | Ti | D |
| 17 | 12 nm | 15 nm | Al | Cr | D |
| 18 | 12 nm | 15 nm | Al | $ZnS—SiO_2$ | D |
| 19 | 12 nm | 15 nm | Cr | $ZnS—SiO_2$ | D |
| 20 | 12 nm | 15 nm | absent | Al | D |
| 21 | 12 nm | 15 nm | Cr | absent | D |

Although the heat conductivity of each material used for the intermediate layer and the reflective layer depends on the temperature, approximate value ranges can be specified as follows: in the order of the largest heat conductivity, the heat conductivity of Al is about 150 to 250 W/m·k at 30 to 600° C.; 50 to 100 W/m·k for Cr; 20 to 50 W/m·k for Ti; 5 to 20 W/m·k for $WSi_2$; 1.0 to 3.0 W/m·k for PbTe; and 0.1 to 0.5 W/m·k for $ZnS—SiO_2$.

Referring to Table 2, when comparing the optical disks Nos. 1 to 5, where the thickness of the recording layer is different, the cross erase is large for No.5, the cross erase is slightly better for Nos. 1 and 4, and the cross erase is sufficiently small for Nos. 3 and 4. Therefore, the thickness of the recording layer is required to be from 4 nm to 16 nm, preferably from 6 nm to 14 nm, in view of the reduction of the cross erase.

Next, when comparing the optical disks No. 3 and Nos. 6 to 11, where the thickness of the upper protective layer is different, the cross erase is smaller as the thickness of the upper protective layer is larger. Therefore, the thickness of the upper protective layer preferably is 10 nm or more, and more preferably 20 nm or more, in view of the reduction of the cross erase.

Furthermore, the optical disks No. 3 and Nos. 12 to 21, where the materials of the intermediate layer and the reflective layer are different, are compared. Among them, apart from No.3, the cross erase in Nos. 12 to 14 is small. In these disks, Al which has the largest heat conductivity among the materials used in this example was used for the reflective layer, and the materials for the intermediate layers have a heat conductivity between that of the upper protective layers and that of the reflective layers.

On the other hand, other optical disks Nos. 15 to 21 have large cross erase. In Nos. 15 to 19, the heat conductivity of the intermediate layer is larger than that of the reflective layer. Especially in No. 17, the materials of the intermediate layer and the reflective layer are those of No.3 replaced by each other, and there is a large difference in the cross erase between Nos. 3 and 17. Furthermore, in Nos. 20 and 21 where either one of the intermediate layer or the reflective layer is omitted, the cross erase is large.

Thus, it is confirmed that when a plurality of layers are laminated on a recording layer, the cross erase can be suppressed by selecting materials for the layers so that the layers have heat conductivities that vary from low to high gradually from layer to layer in the order of the closeness to the recording layer. This is because in the process of transmitting heat from the recording layer to the reflective layer via the upper protective layer and the intermediate layer, the transmitting rate is accelerated so that the heat conductivity in the plane of the recording layer is reduced, thereby suppressing the influence on the adjacent tracks.

Furthermore, with respect to the structure shown as No. 3, an optical disk as shown in FIG. 3, where interface layers composed of Ge, O and N having a thickness about 10 nm were formed on and under the recording layer in contact, was produced. The GeON film was formed with a Ge target in a gas containing Ar, $N_2$ and $O_2$ by reactive sputtering. In order to investigate the repetition characteristics of this optical disk, 3T signals and 11T signals were recorded alternately 10,000 or 100,000 times, and a change of the amplitude of the 3T signal from the amplitude of a 3T signal after 10 recordings was measured.

The results were as follows. After 10,000 recordings, the amplitudes of both of the No. 3 and the optical disk including the interface layers dropped by 0.5 dB or less, which is in an error range. However, after 100,000 recordings, the amplitude of the disk No. 3 dropped by about 3 dB, whereas the amplitude of the optical disk including the interface layers dropped by the same level of 0.5 dB or less as before. This fact confirms that in addition to the reduction of the cross erase, the repetition characteristics can improve further by providing the interface layers.

The compositions of the recording layers of the optical disks were analyzed by an Auger electron spectroscopy. The results were that the ratio of N atoms was about 2.2 at %. Furthermore, a plurality of optical disks with the same structure as that of No.3 were formed by changing the partial pressure of the $N_2$ gas during the formation of the recording layer. As a result of analysis, the ratios of N atoms in the recording layers were about 0.0, 0.2, 0.8, 4.0 and 7.6 at %.

In order to investigate the repetition characteristics of these optical disks, 3T signals and 11T signals were recorded alternately 10,000 or 100,000 times, and a change of the amplitude of the 3T signal from the amplitude of the 3T signal after 10 recordings was measured.

The results were as follows. After 10,000 recordings, the amplitude drop in all of the optical disks was 0.5 dB or less, which is in an error range. However, after 100,000 recordings, the amplitude of only the disk having a ratio of N atoms in the recording layer of 0.0 at % dropped by about 2 dB, whereas the amplitude of the optical disk having a ratio of N atoms of about 0.2 at % dropped by 1 dB, and the amplitude of other disks dropped by 0.5 dB or less, which is within an error range. Furthermore, a 3T signal was recorded on these disks, and the amplitude of the 3T signal was measured. Then, the disks were stored under an environment at 90° C. and a relative humidity of 80% for 100 hours, and then the amplitude of the 3T signal was measured so as to obtain a change in the amplitude. The results were that the amplitude of the disk having a ratio of N atoms in the recording layer of 7.6 at % dropped by 5 dB or more, the amplitude of the disk having a ratio of 4.0 at % dropped by about 2 dB, and the amplitude of the other disks did not substantially drop. These results confirm that a preferable ratio of N atoms in the recording layer is 0.0 to 6.0 at % and more preferably 0.5 to 4.0 at %.

Example 2

A substrate formed of polycarbonate resin and having a thickness of 0.6 mm and lands and grooves, each of which had a width of 0.6 µm, was used. The depth of the groove was about 70 nm.

Lower protective layers having a thickness of about 150 nm were formed with a target of $ZnS$—$SiO_2$ (the ratio in the number of molecules $ZnS:SiO_2=80:20$) on the substrate. Recording layer having a thickness of about 10 nm were formed with a target of Ge—Sb—Te (the ratio in the number of atoms Ge:Sb:Te=22:25:53) thereon. Upper protective layers having a thickness of about 30 nm were formed with a target of $ZnS$—$SiO_2$ (the ratio in the number of molecules $ZnS:SiO_2=80:20$) thereon. Light absorption layers with various thicknesses were formed thereon with various materials, for example, PbTe (the ratio in the number of atoms Pb:Te=50:50) target thereon. Reflective layers with various thicknesses were formed thereon with various materials, for example, an Au target. These layers were formed by sputtering and laminated one after another. The sputtering targets for all the layers had a diameter of 10 cm and a thickness of 6 mm. All the layers except the recording layer were formed by sputtering in an Ar gas, and the recording layer was formed in a mixed gas of Ar and $N_2$ (a total pressure of 1 mTorr and a partial pressure of $N_2$ gas of about 5%).

The reflective layers of the thus obtained optical disks were overcoated with ultraviolet curable resin, and the disks were annealed with laser light so that the entire surface was crystallized for initialization. Thus, optical disks Nos. 31 to 47 were produced. These optical disks were produced by intentionally changing the materials and the thicknesses of the light absorption layer and the reflective layer in order to investigate the dependence of the recording and reproducing characteristics on the material and the thickness structure. Table 3 shows the materials and the thicknesses of the light absorption layer and the reflective layer of each optical disk.

The optical constant (refractive index n and extinction coefficient k) of each layer at a wavelength of 660 nm obtained by actual measurement are as follows: n=1.6 and k=0.0 for the substrate; n=2.1 and k=0.0 for $ZnS$—$SiO_2$ for the lower protective layer and the upper protective layer; n=4.1 and k=1.6 in the amorphous state of Ge—Sb—Te as the recording layer; n=3.9 and k=4.2 in the crystalline state thereof; n=5.0 and k=3.2 for PbTe for the light absorption layer and the reflective layer; n=0.3 and k=3.6 for Au; n=1.4 and k=6.4 for Al; n=2.2 and k=4.4 for Pb; n=3.6 and k=3.4 for Cr; n=2.5 and k=1.2 for TiN; n=3.2 and k=2.2 for PdTe; n=4.5 and k=2.5 for $Ge_{80}Cr_{20}$; and n=0.3 and k=4.0 for $Ag_{98}Pd_1Cu_1$. The optical calculation was performed based on these values, and Table 3 also shows the calculated Acry/Aamo and ΔR.

Mark edge recording was performed at a linear velocity of 6.0 m/s (the radius position is at about 32 mm and the rotation number is about 1800 rpm) on these optical disks using an optical system with a wavelength of 660 nm and an NA of 0.6, and the following measurement was performed. First, a 3T signal with 9.7 MHz and a 11T signal with 2.6 MHz were recorded on a groove and a land alternately 11 times, and this track where the 3T signal is recorded was reproduced so that the C/N ratio and the erasure ratio were measured with a spectrum analyzer. Herein, the erasure ratio is defined as a difference $(A_3-A_{11})$ between the amplitude $A_3$ of the 3T signal and the amplitude $A_{11}$ of a 11T residual signal.

Furthermore, a 8–16 modulated random signal was recorded 11 times, and jitter was measured with a time interval analyzer. The jitter refers to a dislocation on the time axis between a recorded original signal and a reproduction signal, and is expressed as (σsum/T) obtained by dividing a sum (σsum) of standard deviations of jitters of signals of 3T to 11T by a window width (T) for signal detection. For example, it is known that a jitter of 12.8% or less corresponds to a bit error rate of $10^{-4}$ or less, supposing the dislocation on the time axis is in the normal distribution.

As the laser modulation waveform for recording the signal, in the case of a nT (n is an integer, $3 \leq n \leq 1$) signal, a pulse train consisting of (n2−) pulses (powder level $P_1$) was used. The pulse width of the leading pulse in the pulse train was 51.3 ns, the pulse width of all the pulses other than the leading pulse was 17.1 ns, and the width between the pulses was 17.1 ns (powder level $P_3$). In addition, a cooling section of 34.2 ns (powder level $P_4$) was provided immediately after the last pulse. For a portion where no mark is to be recorded, continuous light (non-modulated light) at power level $P_2$ was used. The recording power level $P_1$ was 1.5 times the lower limit of powers that allow the C/N ratio to exceed 45 dB when the 3T signal is recorded. The power level $P_2$ was a power that provides the largest erasure ratio. The power levels $P_3$ and $P_4$ were 1 mW, which was equal to the reproducing power level.

Table 3 shows the results of the measurement under the conditions described above. In the results of the measurement in Table 3, the sample that is sufficient for a practical recording medium is shown by "B", the sample that is particularly excellent is shown by "A", the sample that is insufficient but possibly usable depending on the specification of the density, linear velocity and the recording and reproducing system is shown by "C", and the sample that cannot be used is shown by "D". More specifically, as for the C/N ratio, "A" corresponds to 53 dB ore more, "B" corresponds to 50 dB or more and less than 53 dB, "C" corresponds to 47 dB or more and less than 50 dB, and "D" corresponds to less than 47 dB. As for the erasure ratio, "A" corresponds to 24 dB or more, "B" corresponds to 20 dB or more and less than 24 dB, "C" corresponds to 16 dB or more and less than 20 dB, and "D" corresponds to less than 16 dB.

As for the jitter, "A" corresponds to less than 8%, "B" corresponds to 8% or more and less than 10%, "C" corresponds to 10% or more and less than 13%, and "D" corresponds to 13% or more.

TABLE 3

| No. | Light absorption layer material | thickness (nm) | Reflective layer material | thickness (nm) | Optical calculation Ac/Aa | ΔR (%) | C/N ratio | erasure ratio | jitter |
|---|---|---|---|---|---|---|---|---|---|
| 31 | PdTe | 20 | Au | 10 | 1.12 | 19.3 | B | B | C |
| 32 | PdTe | 20 | Au | 20 | 1.13 | 19.5 | A | B | B |
| 33 | PdTe | 20 | Au | 40 | 1.15 | 19.5 | A | A | A |
| 34 | PdTe | 20 | Au | 80 | 1.16 | 19.4 | A | A | A |
| 35 | PdTe | 5 | Au | 80 | 1.04 | 16.5 | B | C | C |
| 36 | PdTe | 10 | Au | 80 | 1.15 | 18.0 | A | B | B |
| 37 | PdTe | 40 | Au | 80 | 1.06 | 19.6 | A | C | C |
| 38 | PdTe | 60 | Au | 80 | 1.06 | 19.8 | B | C | D |
| 39 | PdTe | 20 | Pd | 80 | 1.11 | 19.8 | B | B | B |
| 40 | PdTe | 20 | Cr | 80 | 1.04 | 19.8 | B | C | C |
| 41 | Al | 20 | Au | 80 | 0.89 | 16.8 | B | D | D |
| 42 | Pd | 20 | Au | 80 | 0.97 | 18.5 | A | D | C |
| 43 | Cr | 20 | Au | 80 | 1.13 | 19.4 | A | A | A |
| 44 | Cr | 20 | Al | 80 | 1.05 | 19.6 | B | C | C |
| 45 | Au | 20 | PdTe | 80 | 0.93 | 17.3 | B | D | D |
| 46 | TiN | 60 | Au | 80 | 1.13 | 18.1 | B | A | B |
| 47 | PdTe | 40 | Au | 80 | 1.10 | 18.5 | B | A | A |
| 48 | $Ge_{80}Cr_{20}$ | 40 | Au | 80 | 1.18 | 20.1 | A | A | A |
| 49 | $Ge_{80}Cr_{20}$ | 40 | $Ag_{98}Pd_1Cu_1$ | 80 | 1.18 | 20.1 | A | A | A |

For disks Nos. 31 to 38, PbTe, which has a large refractive index, was used for the light absorption layer, and Au, which has a small refractive index and a large heat conductivity, was used for the reflective layer. For disks No. 31 to 34, the thickness of the reflective layer was changed. For disks No. 34 to 38, the thickness of the light absorption layer was changed.

When the disk Nos. 31 to 34 are compared, as the thickness of the Au the reflective layer becomes larger, the jitter becomes better because the cooling ability is raised. When the thickness of the reflective layer is in the vicinity of the thickness equal to or more than the thickness of the light absorption layer, the jitter is 10% or less.

When the disk Nos. 34 to 38 are compared, in the case of the disk No. 35 where the thickness of the light absorption layer is excessively small, and the disk Nos. 37 and 38 where the thickness of the light absorption layer is excessively large, both the optical characteristics and the evaluation results are poor. On the other hand, in the case of the disks Nos. 34 and 36, since the thickness of the light absorption layer is appropriate, all of the C/N ratio, the erasure ratio and the jitter are satisfactory. Thus, an appropriate thickness of the light absorption layer is in a range from 0.1 $\lambda/(n_1 \cdot k_1)$ to 1.0 $\lambda/(n_1 \cdot k_1)$.

For the disks No. 39 to 47, the materials of the light absorption layer and the reflective layer were changed. Compared to the disk No. 34, which has Δn=4.7, the disk No. 40 (Δn=1.4), the disk No. 41 (Δn=1.1), the disk No. 42 (Δn=1.9), the disk No. 44 (Δn=1.4), and the disk No. 45 (Δn=−4.7) have poor optical characteristics because the values of Δn are smaller than 2 and low C/N ratios and erasure ratios, resulting in large jitters. Although the disk No. 39 (Δn=2.8), the disk No. 43 (Δn=3.3), the disk No. 46 (Δn=2.2), and the disk No. 47 (Δn=2.9) have Δn of 2 or more, and have satisfactory characteristics, but as the disks have smaller Δn, the recording and reproducing characteristics are poorer. These results show that it is preferable that Δn is 2.5 or more, more preferably 3 or more.

Furthermore, with respect to the structure shown as No. 34, optical disks as shown in FIG. 7, where interface layers 39 composed of a GeON film having a thickness about 5 nm were formed on a surface of the recording layer 33 on the side of the substrate 31 and /or on a surface of the recording layer 33 on the side opposite to the substrate 31, were produced. The GeON film was formed with a Ge target in a gas containing Ar, $N_2$ and $O_2$ by reactive sputtering. The same measurement as that for the disk No. 34 was performed with respect to these disks. The results were as follows. All of the disks had C/N ratios similar to that of the disk No. 34. However, with respect to the disk including the interface layer 39 (GeON film) only on the surface of the recording layer 33 on the side of the substrate 31, the disk including the interface layer 39 only on the surface of the recording layer 33 on the side opposite to the substrate 31, and the disk including the interface layers 39 on the surfaces of the recording layer 33 both on the side of the substrate 31 and the side opposite thereto, the erasure ratios thereof improved from that of the disk No. 34 by about 2 dB, about 4 dB, and about 5 dB, respectively, and the jitter values were 8% or less, which is satisfactory. These results confirm that the interface layer 39 improves the erasure characteristics of the optical information recording medium of this embodiment.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium comprising a transparent substrate and a multi-layered film formed on the transparent substrate, the multi-layered film including a lower protective layer, a recording layer that changes reversibly between different states detectable optically by irradiation of light beams, an upper protective layer, an intermediate layer and a reflective layer in this order from a side near the transparent substrate, wherein, of the upper protective layer, the intermediate layer and the reflective layer, a heat conductivity of a layer closest to the recording layer is a smallest of the three layers, and heat conductivities of the others of the three layers increase with increasing distance from the recording layer, and a thickness of the recording layer is from 4 nm to 14 nm.

2. The optical information recording medium according to claim 1, wherein a thickness of the recording layer is from 6 nm to 14 nm.

3. The optical information recording medium according to claim 1, wherein a thickness of the upper protective layer is from 10 nm to 200 nm.

4. An optical information recording medium comprising a transparent substrate and a multi-layered film formed on the transparent substrate, the multi-layered film including a lower protective layer, a recording layer that changes reversibly between different states detectable optically by irradiation of light beams, an upper protective layer, an intermediate layer and a reflective layer in this order from a side near the transparent substrate, wherein, of the upper protective layer, the intermediate layer and the reflective layer, a heat conductivity of a layer closest to the recording layer is a smallest of the three layers, and heat conductivities of the others of the three layers increase with increasing distance from the recording layer, and a thickness of the recording layer is from 4 nm to 14 nm, and further comprising an interface layer at least at one interface selected from the group consisting of an interface between the lower protective layer and the recording layer and an interface between the recording layer and the upper protective layer.

5. The optical information recording medium according to claim 4, wherein the interface layer comprises at least one selected from the group consisting of Ge, Si, Cr, Ti and Al.

6. The optical information recording medium according to claim 1, wherein the recording layer comprises Ge, Sb and Te.

7. The optical information recording medium according to claim 6, wherein the recording layer comprises Ge, Sb and Te as main components and further comprises not more than 6.0 at % of N.

8. The optical information recording medium according to claim 1, wherein at least one layer selected from the group consisting of the upper protective layer and the lower protective layer comprises 60 to 100 mol % of ZnS and 40 to 0 mol % of $SiO_2$.

9. The optical information recording medium according to claim 1, wherein the reflective layer comprises at least one selected from the group consisting of Au, Ag, Cu and Al.

10. The optical information recording medium according to claim 1, wherein the intermediate layer comprises at least one element selected from the group consisting of Ti, Zr, Hf, V, Nb, Ta, Cr, Mo, W, Mn, Os, Al, Ga, In, C, Si, Ge, Sn, Pb, Sb and Bi.

11. The optical information recording medium according to claim 10, wherein the intermediate layer comprises at least one compound selected from the group consisting of oxide, nitride, carbide, sulfide, fluoride, selenide and telluride.

12. The optical information recording medium according to claim 10, wherein the intermediate layer comprises a compound consisting of at least two elements selected from the group consisting of Th, Zr, Hf, V, Nb, Ta, Cr, Mo, W, Mn, Os, Al, Ga, In, C, Si, Ge, Sn, Pb, Sb and Bi.

13. The optical information recording medium according to claim 1, wherein a reflectance difference (Rcry−Ramo) is not less than 5%, and an absorptance ratio (Acry/Aamo) is not less than 1.0, where Rcry and Acry are a reflectance that is a ratio of light beams reflected by the recording medium and an absorptance that is a ratio of light beams absorbed by the recording layer, respectively, when the recording layer is crystalline, and Ramo and Aamo are those when the recording layer is amorphous.

14. An optical information recording medium comprising a transparent substrate and a multi-layered film formed on the transparent substrate, the multi-layered film including a lower protective layer, a recording layer that changes reversibly between different states detectable optically by irradiation of light beams, an upper protective layer, a light absorption layer and a reflective layer in this order from a side near the transparent substrate, wherein a difference $\Delta n = n_1 - n_2$ between a refractive index $n_1$ of the light absorption layer and a refractive index $n_2$ of the reflective layer at a wavelength $\lambda$ of the light beams is 2 to 6, and a thickness of the reflective layer is not smaller than a thickness of the light absorption layer.

15. The optical information recording medium according to claim 14, wherein the light absorption layer has a thickness $d_1$ in a range of $0.1 \lambda/(n_1 \cdot k_1) \leq d_1 \leq 1.0 \lambda/(n_1 \cdot k_1)$, where $k_1$ is an extinction coefficient of the light absorption layer.

16. An optical information recording medium comprising a transparent substrate and a multi-layered film formed on the transparent substrate, the multi-layered film including a lower protective layer, a recording layer that changes reversibly between different states detectable optically by irradiation of light beams, an upper protective layer, a light absorption layer and a reflective layer in this order from a side near the transparent substrate, wherein a difference $\Delta n = n_1 - n_2$ between a refractive index $n_1$ of the light absorption layer and a refractive index $n_1$ of the reflective layer at a wavelength $\lambda$ of the light beams is 2 to 6, and a thickness of the reflective layer is not smaller than a thickness of the light absorption layer, and further comprising an interface layer at least at one interface selected from the group consisting of an interface between the lower protective layer and the recording layer and an interface between the recording layer and the upper protective layer.

17. The optical information recording medium according to claim 16, wherein the interface layer comprises at least one selected from the group consisting of Ge, Si, Cr, Ti and Al.

18. The optical information recording medium according to claim 14, wherein a thickness of the recording layer is from 4 nm to 14 nm.

19. The optical information recording medium according to claim 14, wherein a thickness of the upper protective layer is from 10 nm to 200 nm.

20. The optical information recording medium according to claim 14, wherein the recording layer comprises Ge, Sb and Te.

21. The optical information recording medium according to claim 20, wherein the recording layer comprises Ge, Sb and Te as main components and further comprises not more than 6.0 at % of N.

22. The optical information recording medium according to claim 14, wherein at least one layer selected from the group consisting of the upper protective layer and the lower protective layer comprises 60 to 100 mol % of ZnS and 40 to 0 mol % of $SiO_2$.

23. The optical information recording medium according to claim 14, wherein the reflective layer comprises at least one selected from the group consisting of Au, Ag, and Cu.

24. The optical information recording medium according to claim 14, wherein the light absorption layer comprises at least one element selected from the group consisting of Ti, Zr, Hf, V, Nb, Ta, Cr, Mo, W, Mn, Os, Al, Ga, In, C, Si, Ge, Sn, Pb, Sb and Bi.

25. The optical information recording medium according to claim 24, wherein the light absorption layer comprises at least one compound selected from the group consisting of oxide, nitride, carbide, sulfide, fluoride, selenide and telluride.

26. The optical information recording medium according to claim 24, wherein the light absorption layer comprises a compound consisting of at least two elements selected from the group consisting of Ti, Zr, Hf, V, Nb, Ta, Cr, Mo, W, Mn, Os, Al, Ga, In, C, Si, Ge, Sn, Pb, Sb and Bi.

27. The optical information recording medium according to claim 14, wherein a reflectance difference (Rcry−Ramo) is not less than 5%, and an absorptance ratio (Acry/Aamo) is not less than 1.0, where Rcry and Acry are a reflectance that is a ratio of light beams reflected by the recording medium and an absorptance that is a ratio of light beams absorbed by the recording layer, respectively, when the recording layer is crystalline, and Ramo and Aamo are those when the recording layer is amorphous.

28. An optical information recording medium comprising a transparent substrate and a multi-layered film formed on the transparent substrate, the multi-layered film including a lower protective layer, a recording layer that changes reversibly between different states detectable optically by irradiation of light beams, an upper protective layer, a light absorption layer and a reflective layer in this order from a side near the transparent substrate, wherein the light absorption layer has a thickness $d_1$ in a range of $0.1 \lambda/(n_1 \cdot k_1) \leq d_1 \leq 1.0 \lambda/(n_1 \cdot k_1)$, where $\lambda$ is a wavelength of the light beams, and $n_1$ and $k_1$ are a refractive index and an extinction coefficient, respectively, of the light absorption layer at the wavelength $\lambda$.

29. An optical information recording medium comprising a transparent substrate and a multi-layered film formed on the transparent substrate, the multi-layered film including a lower protective layer, a recording layer that changes reversibly between different states detectable optically by irradiation of light beams, an upper protective layer, a light absorption layer and a reflective layer in this order from a side near the transparent substrate, wherein the light absorption layer has a thickness $d_1$ in a range of $0.1 \lambda/(n_1 \cdot k_1) \leq d_1 \leq 1.0 \lambda/(n_1 \cdot k_1)$, where $\lambda$ is a wavelength of the light beams, and $n_1$ and $k_1$ are a refractive index and an extinction coefficient, respectively, of the light absorption layer at the wavelength $\lambda$, and further comprising an interface layer at least at one interface selected from the group consisting of an interface between the lower protective layer and the recording layer and an interface between the recording layer and the upper protective layer.

30. The optical information recording medium according to claim 29, wherein the interface layer comprises at least one selected from the group consisting of Ge, Si, Cr, Ti and Al.

31. The optical information recording medium according to claim 28, wherein a thickness of the recording layer is from 4 nm to 14 nm.

32. The optical information recording medium according to claim 28, wherein a thickness of the upper protective layer is from 10 nm to 200 nm.

33. The optical information recording medium according to claim 28, wherein the recording layer comprises Ge, Sb and Te.

34. The optical information recording medium according to claim 33, wherein the recording layer comprises Ge, Sb and Te as main components and further comprises not more than 6.0 at % of N.

35. The optical information recording medium according to claim 28, wherein at least one layer selected from the group consisting of the upper protective layer and the lower protective layer comprises 60 to 100 mol % of ZnS and 40 to 0 mol % of $SiO_2$.

36. The optical information recording medium according to claim 28, wherein the reflective layer comprises at least one selected from the group consisting of Au, Ag, and Cu.

37. The optical information recording medium according to claim 28, wherein the light absorption layer comprises at least one element selected from the group consisting of Ti, Zr, Hf, V, Nb, Ta, Cr, Mo, W, Mn, Os, Al, Ga, In, C, Si, Ge, Sn, Pb, Sb and Bi.

38. The optical information recording medium according to claim 37, wherein the light absorption layer comprises at least one compound selected from the group consisting of oxide, nitride, carbide, sulfide, fluoride, selenide and telluride.

39. The optical information recording medium according to claim 37, wherein the light absorption layer comprises a compound consisting of at least two elements selected from the group consisting of Ti, Zr, Hf, V, Nb, Ta, Cr, Mo, W, Mn, Os, Al, Ga, In, C, Si, Ge, Sn, Pb, Sb and Bi.

40. The optical information recording medium according to claim 28, wherein a reflectance difference (Rcry−Ramo) is not less than 5%, and an absorptance ratio (Acry/Aamo) is not less than 1.0, where Rcry and Acry are a reflectance that is a ratio of light beams reflected by the recording medium and an absorptance that is a ratio of light beams absorbed by the recording layer, respectively, when the recording layer is crystalline, and Ramo and Aamo are those when the recording layer is amorphous.

41. An optical information recording medium comprising a transparent substrate and, on the transparent substrate, a first information layer, a separating layer and a second information layer in this order from a side near the transparent substrate,
the second information layer including a lower protective layer, a recording layer that changes reversibly between different states detectable optically by irradiation of light beams, an upper protective layer, an intermediate layer and a reflective layer in this order from a side near the transparent substrate,
wherein, of the upper protective layer, the intermediate layer and the reflective layer, a heat conductivity of a layer closest to the recording layer is a smallest of the three layers, and heat conductivities of the others of the three layers increase with increasing distance from the recording layer, and
a thickness of the recording layer is from 4 nm to 14 nm.

42. An optical information recording medium comprising a transparent substrate and, on the transparent substrate, a first information layer, a separating layer and a second information layer in this order from a side near the transparent substrate,
the second information layer including a lower protective layer, a recording layer that changes reversibly between different states detectable optically by irradiation of light beams, an upper protective layer, a light absorption layer and a reflective layer in this order from a side near the transparent substrate, wherein
a difference $\Delta n = n_1 - n_2$ between a refractive index $n_1$ of the light absorption layer and a refractive index $n_2$ of the reflective layer at a wavelength $\lambda$ of the light beams is 2 to 6, and
a thickness of the reflective layer is not smaller than a thickness of the light absorption layer.

43. An optical information recording medium comprising a transparent substrate and, on the transparent substrate, a first information layer, a separating layer and a second information layer in this order from a side near the transparent substrate,
the second information layer including a lower protective layer, a recording layer that changes reversibly between different states detectable optically by irradiation of light beams, an upper protective layer, a light absorption layer and a reflective layer in this order from a side near the transparent substrate,
wherein the light absorption layer has a thickness $d_1$ in a range of $0.1 \, \lambda/(n_1 \cdot k_1) \leq d_1 \leq 1.0 \, \lambda/(n_1 \cdot k_1)$, where $\lambda$ is a wavelength of the light beams, and $n_1$ and $k_1$ are a refractive index and an extinction coefficient, respectively, of the light absorption layer at the wavelength $\lambda$.

44. A method for producing an optical information recording medium comprising:
forming a multi-layered film on a transparent substrate, the multi-layered film including a lower protective layer, a recording layer that changes reversibly between different states detectable optically by irradiation of light beams, an upper protective layer, an intermediate layer and a reflective layer in this order from a side near the transparent substrate;
wherein, of the upper protective layer, the intermediate layer and the reflective layer, a heat conductivity of a layer closest to the recording layer is a smallest of the three layers, and heat conductivities of the others of the three layers increase with increasing distance from the recording layer, and
a thickness of the recording layer is from 4 nm to 14 nm.

45. The method according to claim 44, wherein the recording layer is formed at a rate not more than 200 nm/min.

46. The method according to claim 44, wherein the recording layer is formed in an atmosphere containing inert gas and nitrogen gas, where the content of the nitrogen gas is adjusted so that the recording layer contains not more than 6.0 at % of nitrogen atoms.

47. A method for producing an optical information recording medium comprising:
forming a multi-layered film on a transparent substrate, the multi-layered film including a lower protective layer, a recording layer that changes reversibly between different states detectable optically by irradiation of light beams, an upper protective layer, a light absorption layer and a reflective layer in this order from a side near the transparent substrate,
wherein a difference $\Delta n = n_1 - n_2$ between a refractive index $n_1$ of the light absorption layer and a refractive index $n_2$ of the reflective layer at a wavelength $\lambda$ of the light beams is 2 to 6, and
a thickness of the reflective layer is not smaller than a thickness of the light absorption layer.

48. The method according to claim 47, wherein the recording layer is formed at a rate not more than 200 nm/min.

49. The method according to claim 47, wherein the recording layer is formed in an atmosphere containing inert gas and nitrogen gas, where the content of the nitrogen gas is adjusted so that the recording layer contains not more than 6.0 at % of nitrogen atoms.

50. A method for producing an optical information recording medium comprising:
forming a multi-layered film on a transparent substrate, the multi-layered film including a lower protective layer, a recording layer that changes reversibly between different states detectable optically by irradiation of light beams, an upper protective layer, a light absorption layer and a reflective layer in this order from a side near the transparent substrate,
wherein the light absorption layer is formed so that $0.1 \, \lambda/(n_1 \cdot k_1) \leq d_1 \leq 1.0 \, \lambda/(n_1 \cdot k_1)$ is satisfied, where $d_1$ is a thickness of the light absorption layer, $\lambda$ is a wavelength of the light beams, and $n_1$ and $k_1$ are a refractive index and an extinction coefficient, respectively, of the light absorption layer at the wavelength $\lambda$.

51. The method according to claim 50, wherein the recording layer is formed at a rate not more than 200 nm/min.

52. The method according to claim 50, wherein the recording layer is formed in an atmosphere containing inert gas and nitrogen gas, where the content of the nitrogen gas is adjusted so that the recording layer contains not more than 6.0 at % of nitrogen atoms.

53. A method for producing an optical information recording medium comprising:
   forming a first information layer on a transparent substrate;
   forming a second information layer on a protective substrate; and
   attaching the transparent substrate and the protective substrate via a separating layer, thereby forming the first information layer, the separating layer and the second information layer on the transparent substrate in this order,
   wherein as the second information layer, a lower protective layer, a recording layer that changes reversibly between different states detectable optically by irradiation of light beams, an upper protective layer, an intermediate layer and a reflective layer are formed in this order from a side near the transparent substrate,
   wherein, of the upper protective layer, the intermediate layer and the reflective layer, a heat conductivity of a layer closest to the recording layer is a smallest of the three layers, and heat conductivities of the others of the three layers increase with increasing distance from the recording layer, and
   a thickness of the recording layer is from 4 nm to 14 nm.

54. A method for producing an optical information recording medium comprising:
   forming a first information layer on a transparent substrate;
   forming a second information layer on a protective substrate; and
   attaching the transparent substrate and the protective substrate via a separating layer, thereby forming the first information layer, the separating layer and the second information layer on the transparent substrate in this order,
   wherein as the second information layer, a lower protective layer, a recording layer that changes reversibly between different states detectable optically by irradiation of light beams, an upper protective layer, a light absorption layer and a reflective layer are formed in this order from a side near the transparent substrate,
   a difference $\Delta n = n_1 - n_2$ between a refractive index $n_1$ of the light absorption layer and a refractive index $n_2$ of the reflective layer at a wavelength $\lambda$ of the light beams is 2 to 6, and
   a thickness of the reflective layer is not smaller than a thickness of the light absorption layer.

55. A method for producing an optical information recording medium comprising:
   forming a first information layer on a transparent substrate;
   forming a second information layer on a protective substrate; and
   attaching the transparent substrate and the protective substrate via a separating layer, thereby forming the first information layer, the separating layer and the second information layer on the transparent substrate in this order,
   wherein as the second information layer, a lower protective layer, a recording layer that changes reversibly between different states detectable optically by irradiation of light beams, an upper protective layer, a light absorption layer and a reflective layer are formed in this order from a side near the transparent substrate, and
   the light absorption layer is formed so that $0.1\, \lambda/(n_1 \cdot k_1) \leq d_1 \leq 1.0\, \lambda/(n_1 \cdot k_1)$ is satisfied, where $d_1$ is a thickness of the light absorption layer, $\lambda$ is a wavelength of the light beams, and $n_1$ and $k_1$ are a refractive index and an extinction coefficient, respectively, of the light absorption layer at the wavelength $\lambda$.

56. A method for recording and reproducing an optical information recording medium comprising a transparent substrate and a multi-layered film formed on the transparent substrate, the multi-layered film including a lower protective layer, a recording layer that changes reversibly between different states detectable optically by irradiation of light beams, an upper protective layer, an intermediate layer and a reflective layer in this order from a side near the transparent substrate, wherein, of the upper protective layer, the intermediate layer and the reflective layer, a heat conductivity of a layer closest to the recording layer is a smallest of the three layers, and heat conductivities of the others of the three layers increase with increasing distance from the recording layer, and a thickness of the recording layer is from 4 nm to 14 nm,
   wherein when an intensity of the light beams is represented by power level $P_1$ that can melt an irradiated portion instantly, power levels $P_2$ and $P_3$ (where $P_1 > P_2 \geq P_3 \geq 0$) that cannot melt an irradiated portion instantly, and power level $P_0$ (where $P_1 > P_0 > 0$) that does not change an optical state of a recording mark and provides reflected beams sufficient to reproduce the recording mark by irradiation,
   at least one recording mark to be recorded in the recording layer is formed with a recording pulse train consisting of a group of pulses generated by modulating the light beams between the power levels $P_1$ and $P_3$,
   when the recording mark is not to be recorded, the light beams are maintained at the power level $P_2$, and
   information recorded in the recording layer is reproduced by irradiating the light beams at the power level $P_0$.

57. The method according to claim 56, wherein at least a part of the recording pulse train is generated so that pulse widths and the pulse intervals are substantially identical to other pulse widths and pulse intervals.

58. The method according to claim 56, wherein a cooling section of a power level $P_4$ ($P_2 > P_4 \geq 0$) is provided immediately after the recording pulse train.

59. A method for recording and reproducing an optical information recording medium comprising a transparent substrate and a multi-layered film formed on the transparent substrate, the multi-layered film including a lower protective layer, a recording layer that changes reversibly between different states detectable optically by irradiation of light beams, an upper protective layer, a light absorption layer and a reflective layer in this order from a side near the transparent substrate, wherein a difference $\Delta n = n_1 - n_2$ between a refractive index $n_1$ of the light absorption layer and a refractive index $n_2$ of the reflective layer at a wavelength A of the light beams is 2 to 6, and a thickness of the reflective layer is not smaller than a thickness of the light absorption layer,
   wherein when an intensity of the light beam is represented by power level $P_1$ that can melt an irradiated portion instantly, power levels $P_2$ and $P_3$ (where $P_1 > P_1 \geq P_3 \geq 0$) that cannot melt an irradiated portion instantly, and power level $P_0$ (where $P_1 > P_0 > 0$) that does not change an optical state of a recording mark and provides reflected beams sufficient to reproduce the recording mark by irradiation, at least one recording mark to be recorded in the recording layer is formed with a recording pulse train consisting of a group of pulses generated by modulating the light beams between the power levels $P_1$ and $P_3$, when the recording mark is not to be recorded, the light beams are maintained at the power level $P_2$, and information recorded in the recording layer is reproduced by irradiating the light beams at the power level $P_0$.

60. The method according to claim 59, wherein at least a part of the recording pulse train is generated so that pulse widths and the pulse intervals are substantially identical to other pulse widths and pulse intervals.

61. The method for recording and reproducing an optical information recording medium according to claim 59, wherein a cooling section of a power level $P_4$ (where $P_2 > P_4 \geq 0$) is provided immediately after the recording pulse train.

62. A method for recording and reproducing an optical information recording medium comprising a transparent substrate and a multi-layered film formed on the transparent substrate, the multi-layered film including a lower protective layer, a recording layer that changes reversibly between different states detectable optically by irradiation of light beams, an upper protective layer, a light absorption layer and a reflective layer in this order from a side near the transparent substrate, wherein the light absorption layer has a thickness $d_1$ in a range of $0.1\, \lambda/(n_1 \cdot k_1) \leq d_1 \leq 1.0\, \lambda/(n_1 \cdot k_1)$, where $\lambda$ is a wavelength of the light beams, and $n_1$ and $k_1$ are a refractive index and an extinction coefficient, respectively, of the light absorption layer at the wavelength $\lambda$, wherein when an intensity of the light beam is represented by power level $P_1$ that can melt an irradiated portion instantly, power levels $P_2$ and $P_3$ (where $P_1 > P_2 \geq P_3 \geq 0$) that cannot melt an irradiated portion instantly, and power level $P_0$ (where $P_1 > P_1 > 0$) that does not change an optical state of a recording mark and provides reflected beams sufficient to reproduce the recording mark by irradiation, at least one recording mark to be recorded in the recording layer is formed with a recording pulse train consisting of a group of pulses generated by modulating the light beams between the power levels $P_1$ and $P_3$, when the recording mark is not to be recorded, the light beams are maintained at the power level $P_2$, and information recorded in the recording layer is reproduced by irradiating the light beams at the power level $P_0$.

63. The method according to claim 62, wherein at least a part of the recording pulse train is generated so that pulse widths and the pulse intervals are substantially identical to other pulse widths and pulse intervals.

64. The method according to claim 62, wherein a cooling section of a power level $P_4$ ($P_2 > P_4 > 0$) is provided immediately after the recording pulse train.

65. A method for recording and reproducing an optical information recording medium comprising a transparent substrate and, on the transparent substrate, a first information layer, a separating layer and a second information layer in this order from a side near the transparent substrate, the first information layer including a first recording layer, the second information layer including a lower protective layer, a second recording layer, an upper protective layer, an intermediate layer and a reflective layer in this order from a side near the transparent substrate, the first and second recording layers changing reversibly between different states detectable optically by irradiation of light beams, wherein, of the upper protective layer, the intermediate layer and the reflective layer, a heat conductivity of a layer closest to the recording layer is a smallest of the three layers, and heat conductivities of the others of the three layers increase with increasing distance from the recording layer, and a thickness of the recording layer is from 4 nm to 14 nm, wherein the light beams is incident from a side of the transparent substrate so as to change a state of the first recording layer and the second recording layer, and when an intensity of the light beam is represented by power level $P_1$ that can melt an irradiated portion instantly, power levels $P_2$ and $P_3$ (where $P_1 > P_2 \leq P_3 \leq 0$) that cannot melt an irradiated portion instantly, and power level $P_0$ (where $P_1 > P_0 > 0$) that does not change an optical state of a recording mark and provides reflected beams sufficient to reproduce the recording mark by irradiation, at least one recording mark to be recorded in the recording layer is formed with a recording pulse train consisting of a group of pulses generated by modulating the light beams between the power levels $P_1$ and $P_3$, when the recording mark is not to be recorded, the light beams are maintained at the power level $P_2$, and information recorded in the recording layer is reproduced by irradiating the light beams at the power level $P_0$.

66. A method for recording and reproducing an optical information recording medium comprising a transparent substrate and, on the transparent substrate, a first information layer, a separating layer and a second information layer in this order from a side near the transparent substrate, a first information layer including a first recording layer, the second information layer including a lower protective layer, a second recording layer, an upper protective layer, a light absorption layer and a reflective layer in this order from a side near the transparent substrate, the first and second recording layers changing reversibly between different states detectable optically by irradiation of light beams, wherein a difference $\Delta n = n_1 - n_2$ between a refractive index $n_1$ of the light absorption layer and a refractive index $n_2$ of the reflective layer is 2 to 6, and a thickness of the reflective layer is not smaller than a thickness of the light absorption layer, wherein the light beams is incident from a side of the transparent substrate so as to change a state of the first recording layer and the second recording layer, and when an intensity of the light beam is represented by power level $P_1$ that can melt an irradiated portion instantly, power levels $P_2$ and $P_3$ (where $P_1 > P_2 \geq P_3 \geq 0$) that cannot melt an irradiated portion instantly, and power level $P_0$ (where $P_1 > P_0 > 0$) that does not change an optical state of a recording mark and provides reflected beams sufficient to reproduce the recording mark by irradiation, at least one recording mark to be recorded in the recording layer is formed with a recording pulse train consisting of a group of pulses generated by modulating the light beams between the power levels $P_1$ and $P_3$, when the recording mark is not to be recorded, the light beams are maintained at the power level $P_2$, and information recorded in the recording layer is reproduced by irradiating the light beams at the power level $P_0$.

67. A method for recording and reproducing an optical information recording medium comprising a transparent substrate and, on the transparent substrate, a first information layer, a separating layer and a second information layer in this order from a side near the transparent substrate, the first recording layer including a first recording layer, the second information layer including a lower protective layer, a second recording layer, an upper protective layer, a light absorption layer and a reflective layer in this order from a side near the transparent substrate, the first and second recording layers changing reversibly between different states detectable optically by irradiation of light beams, wherein the light absorption layer has a thickness $d_1$ in a range of $0.1\ \lambda/(n_1 \cdot k_1) \leq d_1 \leq 1.0\ \lambda/(n_1 \cdot k_1)$, where $\lambda$ is a wavelength of the light beams, and $n_1$ and $k_1$ are a refractive index and an extinction coefficient, respectively, of the light absorption layer at the wavelength $\lambda$, wherein the light beams is incident from a side of the transparent substrate so as to change a state of the first recording layer and the second recording layer, and when an intensity of the light beam is represented by power level $P_1$ that can melt an irradiated portion instantly, power levels $P_2$ and $P_3$ (where $P_2 \geq P_3 \geq 0$) that cannot melt an irradiated portion instantly, and power level $P_0$ (where $P_1 > P_0 > 0$) that does not change an optical state of a recording mark and provides reflected beams sufficient to reproduce the recording mark by irradiation, at least one recording mark to be recorded in the recording layer is formed with a recording pulse train consisting of a group of pulses generated by modulating the light beams between the power levels $P_1$ and $P_3$, when the recording mark is not to be recorded, the light beams are maintained at the power level $P_2$, and information recorded in the recording layer is reproduced by irradiating the light beams at the power level $P_0$.

68. An apparatus for recording and reproducing an optical information recording medium comprising an optical information recording medium, a light beam generator for generating light beams with which the optical information recording medium is irradiated, and a light beam intensity modulator for modulating an intensity of the light beams, wherein the optical information recording medium includes a transparent substrate and a multi-layered film formed on the substrate, the multi-layered film including a lower protective layer, a recording layer that changes reversibly between different states detectable optically by irradiation of light beams, an upper protective layer, an intermediate layer and a reflective layer in this order from a side near the transparent substrate, wherein, of the upper protective layer, the intermediate layer and the reflective layer, a heat conductivity of a layer closest to the recording layer is a smallest of the three layers, and heat conductivities of the others of the three layers increase with increasing distance from the recording layer, and a thickness of the recording layer is from 4 nm to 14 nm, when an intensity of the light beam is represented by power level $P_1$ that can melt an irradiated portion instantly, power levels $P_2$ and $P_3$ (where $P_1 > P_2 \geq P_3 \geq 0$) that cannot melt an irradiated portion instantly, and power level $P_0$ (where $P_1 > P_2 \geq 0$) that does not change an optical state of a recording mark and provides reflected beams sufficient to reproduce the recording mark by irradiation, in the case where information is recorded by forming a recording mark in the recording layer, the light beam intensity modulator modulates the light beams between the power levels $P_1$ and $P_3$, so as to generate a recording pulse train consisting of a group of pulses, thereby forming at least one recording mark, and when the recording mark is not to be recorded, the light beam intensity modulator maintains the intensity of the light beams at the power level $P_2$, and in the case where the information recorded in the recording layer is reproduced, the light beam intensity modulator maintains the intensity of the light beams at the power level $P_0$.

69. An apparatus for recording and reproducing an optical information recording medium comprising an optical information recording medium, a light beam generator for generating light beams with which the optical information recording medium is irradiated, and a light beam intensity modulator for modulating an intensity of the light beams, wherein the optical information recording medium includes a transparent substrate and a multi-layered film formed on the transparent substrate, the multi-layered film including a lower protective layer, a recording layer that changes reversibly between different states detectable optically by irradiation of light beams, an upper protective layer, a light absorption layer and a reflective layer in this order from a side near the transparent substrate, wherein a difference $\Delta n = n_1 - n_2$ between a refractive index $n_1$ of the light absorption layer and a refractive index $n_2$ of the reflective layer at a wavelength $\lambda$ of the light beams is 2 to 6, and a thickness of the reflective layer is not smaller than a thickness of the light absorption layer, when an intensity of the light beam is represented by power level $P_1$ that can melt an irradiated portion instantly, power levels $P_2$ and $P_3$ (where $P_1 > P_2 \geq P_3 \geq 0$) that cannot melt an irradiated portion instantly, and power level $P_0$ (where $P_1 > P_0 > 0$) that does not change an optical state of a recording mark and provides reflected beams sufficient to reproduce the recording mark by irradiation, in the case where information is recorded by forming a recording mark in the recording layer, the light beam intensity modulator modulates the light beams between the power levels $P_1$ and $P_3$, so as to generate a recording pulse train consisting of a group of pulses, thereby forming at least one recording mark, and when the recording mark is not to be recorded, the light beam intensity modulator maintains the intensity of the light beams at the power level $P_2$, and in the case where the information recorded in the recording layer is reproduced, the light beam intensity modulator maintains the intensity of the light beams at the power level $P_0$.

70. An apparatus for recording and reproducing an optical information recording medium comprising an optical information recording medium, a light beam generator for generating light beams with which the optical information recording medium is irradiated, and a light beam intensity modulator for modulating an intensity of the light beams, wherein the optical information recording medium includes a transparent substrate and a multi-layered film formed on the transparent substrate, the multi-layered film including a lower protective layer, a recording layer that changes reversibly between different states detectable optically by irradiation of light beams, an upper protective layer, a light absorption layer and a reflective layer in this order from a side near the transparent substrate, wherein the light absorption layer has a thickness $d_1$ in a range of $0.1 \lambda/(n_1 \cdot k_1) \leq d_1 \leq 1.0 \lambda/(n_1 \cdot k_1)$, where $\lambda$ is a wavelength of the light beams, and $n_1$ and $k_1$ are a refractive index and an extinction coefficient, respectively, of the light absorption layer at the wavelength $\lambda$, when an intensity of the light beam is represented by power level $P_1$ that can melt an irradiated portion instantly, power levels $P_2$ and $P_3$ (where $P_1 > P_2 \geq P_3 \geq 0$) that cannot melt an irradiated portion instantly, and power level $P_0$ (where $P_1 > P_0 > 0$) that does not change an optical state of a recording mark and provides reflected beams sufficient to reproduce the recording mark by irradiation, in the case where information is recorded by forming a recording mark in the recording layer, the light beam intensity modulator modulates the light beams between the power levels $P_1$ and $P_3$, so as to generate a recording pulse train consisting of a group of pulses, thereby forming at least one recording mark, and when the recording mark is not to be recorded, the light beam intensity modulator maintains the intensity of the light beams at the power level $P_2$, and in the case where the information recorded in the recording layer is reproduced, the light beam intensity modulator maintains the intensity of the light beams at the power level $P_0$.

71. An apparatus for recording and reproducing an optical information recording medium comprising an optical information recording medium, a light beam generator for generating light beams with which the optical information recording medium is irradiated, and a light beam intensity modulator for modulating an intensity of the light beams, wherein the optical information recording medium includes a transparent substrate and, on the transparent substrate, a first information layer, a separating layer and a second information layer in this order from a side near the transparent substrate, the second information layer including a lower protective layer, a recording layer that changes reversibly between different states detectable optically by irradiation of light beams, an upper protective layer, an intermediate layer and a reflective layer in this order from a side near the transparent substrate, wherein, of the upper protective layer, the intermediate layer and the reflective layer, a heat conductivity of a layer closest to the recording layer is a smallest of the three layers, and heat conductivities of the others of the three layers increase with increasing distance from the recording layer, and a thickness of the recording layer is from 4 nm to 14 nm, wherein the light beam generator is provided on the side of the transparent substrate, when an intensity of the light beam is represented by power level $P_1$ that can melt an irradiated portion instantly, power levels $P_2$ and $P_3$ (where $P_1 > P_2 \geq P_3 \geq 0$) that cannot melt an irradiated portion instantly, and power level $P_0$ (where $P_1 > P_0 \geq 0$) that does not change an optical state of a recording mark and provides reflected beams sufficient to reproduce the recording mark by irradiation, in the case where information is recorded by forming a recording mark in the recording layer, the light beam intensity modulator modulates the light beams between the power levels $P_1$ and $P_3$, so as to generate a recording pulse train consisting of a group of pulses, thereby forming at least one recording mark, and when the recording mark is not to be recorded, the light beam intensity modulator maintains the intensity of the light beams at the power level $P_2$, and in the case where the information recorded in the recording layer is reproduced, the light beam intensity modulator maintains the intensity of the light beams at the power level $P_0$.

72. An apparatus for recording and reproducing an optical information recording medium comprising an optical information recording medium, a light beam generator for generating light beams with which the optical information recording medium is irradiated, and a light beam intensity modulator for modulating an intensity of the light beams, wherein the optical information recording medium includes a transparent substrate and, on the transparent substrate, a first information layer, a separating layer and a second information layer in this order from a side near the transparent substrate, the second information layer including a lower protective layer, a recording layer that changes reversibly between different states detectable optically by irradiation of light beams, an upper protective layer, a light absorption layer and a reflective layer in this order from a side near the transparent substrate, wherein a difference $\Delta n = n_1 - n_2$ between a refractive index $n_1$ of the light absorption layer and a refractive index $n_2$ of the reflective layer is 2 to 6, and a thickness of the reflective layer is not smaller than a thickness of the light absorption layer, wherein the light beam generator is provided on the side of the transparent substrate, when an intensity of the light beam is represented by power level $P_1$ that can melt an irradiated portion instantly, power levels $P_2$ and $P_3$ (where $P_1 > P_2 \geq P_3 \geq 0$) that cannot melt an irradiated portion instantly, and power level $P_0$ (where $P_1 > P_0 \geq 0$) that does not change an optical state of a recording mark and provides reflected beams sufficient to reproduce the recording mark by irradiation, in the case where information is recorded by forming a recording mark in the recording layer, the light beam intensity modulator modulates the light beams between the power levels $P_1$ and $P_3$, so as to generate a recording pulse train consisting of a group of pulses, thereby forming at least one recording mark, and when the recording mark is not to be recorded, the light beam intensity modulator maintains the intensity of the light beams at the power level $P_2$, and in the case where the information recorded in the recording layer is reproduced, the light beam intensity modulator maintains the intensity of the light beams at the power level $P_0$.

73. An apparatus for recording and reproducing an optical information recording medium comprising an optical information recording medium, a light beam generator for generating light beams with which the optical information recording medium is irradiated, and a light beam intensity modulator for modulating an intensity of the light beams, wherein the optical information recording medium includes a transparent substrate and, on the transparent substrate, a first information layer, a separating layer and a second information layer in this order from a side near the transparent substrate, the second information layer including a lower protective layer, a recording layer that changes reversibly between different states detectable optically by irradiation of light beams, an upper protective layer, a light absorption layer and a reflective layer in this order from a side near the transparent substrate, wherein the light absorption layer has a thickness $d_1$ in a range of $0.1\ \lambda/(n_1 \cdot k_1) \leq d_1 \leq 1.0\ \lambda/(n_1 \cdot k_1)$, where $\lambda$ is a wavelength of the light beams, and $n_1$ and $k_1$ are a refractive index and an extinction coefficient, respectively, of the light absorption layer at the wavelength $\lambda$, wherein the light beam generator is provided on the side of the transparent substrate, when an intensity of the light beam is represented by power level $P_1$ that can melt an irradiated portion instantly, power levels $P_2$ and $P_3$ (where $P_1 > _{P2} \geq P_1 \geq 0$) that cannot melt an irradiated portion instantly, and power level $P_0$ (where $P_1 > P_0 > 0$) that does not change an optical state of a recording mark and provides reflected beams sufficient to reproduce the recording mark by irradiation, in the case where information is recorded by forming a recording mark in the recording layer, the light beam intensity modulator modulates the light beams between the power levels $P_1$ and $P_3$, so as to generate a recording pulse train consisting of a group of pulses, thereby forming at least one recording mark, and when the recording mark is not to be recorded, the light beam intensity modulator maintains the intensity of the light beams at the power level $P_2$, and in the case where the information recorded in the recording layer is reproduced, the light beam intensity modulator maintains the intensity of the light beams at the power level $P_0$.

* * * * *